(12) United States Patent
Shmilovich et al.

(10) Patent No.: US 8,376,285 B1
(45) Date of Patent: Feb. 19, 2013

(54) ACTIVE SYSTEMS AND METHODS FOR CONTROLLING AN AIRFOIL VORTEX

(75) Inventors: Arvin Shmilovich, Huntington Beach, CA (US); Yoram Yadlin, Irvine, CA (US); Roger W Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 13/159,424

(22) Filed: Jun. 14, 2011

Related U.S. Application Data

(62) Division of application No. 11/747,112, filed on May 10, 2007, now Pat. No. 8,016,244.

(51) Int. Cl.
*B64C 23/06* (2006.01)

(52) U.S. Cl. ..................................... 244/199.3; 244/208

(58) Field of Classification Search ................ 244/199.2, 244/199.3, 199.4, 207, 208, 76 J
See application file for complete search history.

(56) References Cited

U.S. PATENT DOCUMENTS

| | | | | |
|---|---|---|---|---|
| 3,090,584 A | * | 5/1963 | Kuchemann et al. ...... | 244/199.1 |
| 3,936,013 A | * | 2/1976 | Yuan ........................... | 244/199.3 |
| 4,697,769 A | * | 10/1987 | Blackwelder et al. ...... | 244/199.2 |
| 5,957,413 A | * | 9/1999 | Glezer et al. ................... | 244/208 |
| 5,988,522 A | * | 11/1999 | Glezer et al. ...................... | 239/11 |
| 6,412,732 B1 | * | 7/2002 | Amitay et al. ................... | 244/208 |
| 2006/0145027 A1 | * | 7/2006 | Warsop et al. ................. | 244/207 |
| 2006/0273197 A1 | * | 12/2006 | Saddoughi et al. ...... | 239/265.17 |
| 2008/0087771 A1 | * | 4/2008 | Boespflug et al. ............ | 244/207 |
| 2010/0243819 A1 | * | 9/2010 | Stanislas et al. ............... | 244/207 |

* cited by examiner

*Primary Examiner* — Tien Dinh
*Assistant Examiner* — Michael Kreiner
(74) *Attorney, Agent, or Firm* — Ameh IP; Elahe Toosi; Lowell Campbell

(57) ABSTRACT

Active systems and methods for controlling aircraft vortices are disclosed. An apparatus in accordance with one embodiment is directed to an aircraft system that includes an airfoil having first and second oppositely facing flow surfaces and a tip. The system can further include a vortex dissipation device carried by the airfoil, with the vortex dissipation device including an orifice positioned to direct a flow of fluid outwardly from the tip, an actuator operatively coupled to the fluid flow orifice and positioned to change a manner in which flow is directed outwardly from the tip, and a controller operatively coupled to the actuator to direct the operation of the actuator. The vortex dissipation device can be activated to accelerate the rate at which vortices (e.g., wing tip vortices) dissipate after they are generated, for example, by alternately pulsing flow inwardly and outwardly through the fluid flow orifice.

20 Claims, 24 Drawing Sheets

BEFORE ACTIVATION

AFTER ACTIVATION

US 8,376,285 B1

ACTIVE SYSTEMS AND METHODS FOR CONTROLLING AN AIRFOIL VORTEX

CROSS-REFERENCE TO RELATED APPLICATIONS

The present application is a divisional application of U.S. application Ser. No. 11/747,112, filed May 10, 2007, which is a continuation-in-part of pending U.S. application Ser. No. 11/332,835, filed Jan. 13, 2006, which is a continuation of U.S. application Ser. No. 10/784,067, filed Feb. 20, 2004 and issued as U.S. Pat. No. 7,100,875. The U.S. application Ser. No. 11/747,112 is also a continuation-in-part of pending U.S. application Ser. No. 11/370,099, filed Mar. 7, 2006, which is incorporated herein by reference and which is a continuation-in-part of U.S. application Ser. No. 10/784,067. The U.S. application Ser. No. 11/747,112 also claims priority to U.S. Provisional Application No. 60/840,121, filed on Aug. 25, 2006 and incorporated herein by reference.

TECHNICAL FIELD

The present disclosure relates to controlling (e.g., alleviating) the effects of vortices that form at the outer tips of wings and/or other aerodynamic surfaces, including via reversing pulsed jet flows.

BACKGROUND

Current airport capacity is largely controlled by the hours of operation (which are largely confined to daylight hours to prevent noise pollution in the airport environs) and the frequency with which planes can be brought in and out of the airport. A pacing item in landing and takeoff frequency is the time necessary for the dissipation of wake vortices produced by planes in motion. The size and intensity of wake vortices is determined by the size and weight of the aircraft, and can pose turbulent conditions in the wake of wide body airplanes. In worst case scenarios, these vortices can be strong enough to cause airplane crashes. This problem has been recognized for several decades, and a number of approaches have been suggested to alleviate this problem. However, many proposed solutions have proven to be ineffective or otherwise unsuitable for practical applications. Accordingly, there exists a need for improved techniques for handling the effects of wing tip vortices.

SUMMARY

The present disclosure is directed generally toward systems and methods for the control of aircraft vortices. An aircraft system in accordance with one aspect includes an airfoil having first and second oppositely facing flow surfaces and a tip. The system can further include a vortex dissipation device carried by the airfoil. The vortex dissipation device can include a fluid flow orifice positioned to direct a flow of fluid outwardly from the tip. The device can further include an actuator operatively coupled to the fluid flow orifice, the actuator being positioned to change a manner in which flow is directed outwardly from the tip, and a controller operatively coupled to the actuator to direct the operation of the actuator. For example, the actuator can pulse the flow inwardly and outwardly through the orifice. In particular embodiments, this arrangement can eliminate the need to supply engine bleed air to the orifice. Instead, ambient air adjacent to the airfoil tip can be pulsed back and forth through the orifice to disturb, dissipate, break up and/or otherwise reduce the effects of tip vortices.

BRIEF DESCRIPTION OF THE DRAWINGS

FIGS. 9A, 9B, 9C-1, 9C-2, 9D-1, and 9D-2 illustrating the vortex that is shed from the wing tip in situations without activation of the vortex dissipating apparatus and with the activation of the vortex dissipating apparatus where the frequency of the cyclic movement of the direction of the jet air stream is at 10.7 Hz.

DETAILED DESCRIPTION

Figure 1:
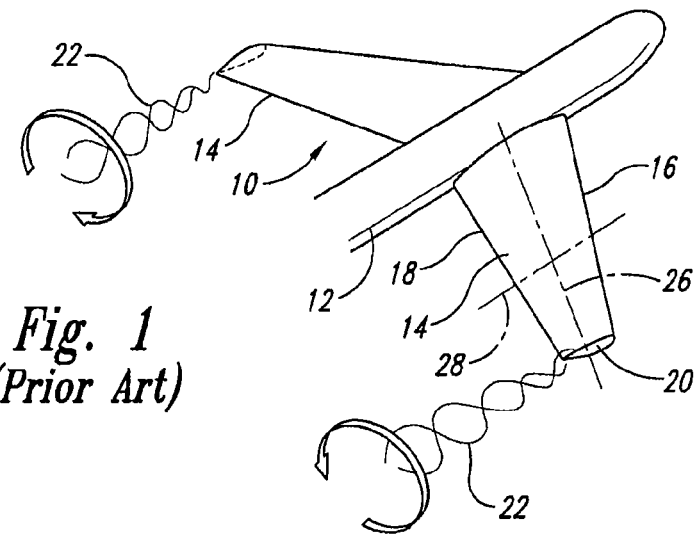
FIG. 1 is an isometric view showing an airplane shedding a vortex at each wing tip location.

Aspects of the present disclosure include airfoil vortex dissipating systems and related methods relating to the same. Airfoils in which the systems are incorporated typically have a leading edge, a trailing edge, an outer end portion, an upper aerodynamic surface, a lower aerodynamic surface, a spanwise axis, a forward to rear chord axis, and an alignment reference plane coincident with the spanwise axis and the chord axis. When the airfoil is functioning to create aerodynamic lift, a vortex is created at the outer end portion of the airfoil (e.g., the tip of the airfoil). The vortex has a vortex core axis, a main circumferential flow region and an outer perimeter flow region.

In one embodiment, the vortex dissipating apparatus includes a nozzle section which is at or proximate to the outer end portion of the airfoil, and has a nozzle discharge portion which in this embodiment is at an alignment location extending generally in a forward to rearward direction at, or proximate to, the outer end portion of the airfoil. The nozzle section is arranged to discharge a jet stream (e.g., a fluid jet) into the vortex. In one embodiment, the fluid jet is discharged in a lateral discharge direction having a substantial discharge alignment component generally perpendicular to the chord axis and parallel to the alignment plane.

A pressurized air inlet section can supply pressurized air to the nozzle section with the pressurized air being discharged from the nozzle section.

In embodiments of the present invention, the nozzle discharge portion is arranged to be actuated to move the lateral discharge direction back and forth, and in embodiments shown herein upwardly and downwardly between upper and lower end locations in a cyclical manner. In at least one embodiment, the lateral discharge direction of the fluid jet moves in cycles rotatably through an angle of at least as great as about one third of a right angle, or through an angle at least as great as about two thirds of a right angle or more.

In an embodiment, the nozzle discharge is arranged so that when the lateral discharge direction is at a generally central location between the upper and lower locations, the nozzle discharge portion is discharging the jet air stream so that the lateral discharge direction has a substantial alignment component generally perpendicular to the chord axis and generally parallel to the alignment reference plane.

In another embodiment, the nozzle discharge portion is arranged so that the lateral discharge direction is at a general central location between the upper and lower locations, and the nozzle discharge system is discharging the jet air stream so that the lateral discharge direction has a substantial alignment component slanting downwardly and outwardly from the referenced alignment plane.

In one mode of operation, the apparatus is arranged so that cyclic frequency of the back and forth movement of the discharge direction is sufficiently high so that dissipation of said vortex is accomplished by alleviating the intensity of the vortex. In different operating modes this cyclic frequency can be greater then 2 Hz, at least as great as 5 Hz, or as great as 10 Hz or greater.

In another mode of operation the vortex dissipating apparatus is arranged so that cyclic frequency of the back and forth movement of the lateral discharge direction is sufficiently low so that dissipation of the vortex is accomplished at least in part by accelerating instability which leads to vortex dissipation. This cyclic frequency can be at least as low as about 2 Hz, or as low as approximately 1 Hz or less.

Also, in yet another embodiment the nozzle discharge portion is arranged so as to have at least two nozzle discharge portions which discharge at least two jet air stream portions, with said jet air stream portions being moved cyclically back and forth in an out of phase relationship.

Aspects of the invention relating to movable discharge nozzles are described initially with reference to FIGS. 1-14E. Aspects of the invention relating to pulsed fluid jets are described with reference to FIGS. 15A-23. These aspects may also be combined in other embodiments, as is also described below.

To describe the above embodiments in more detail, reference is made to FIG. 1, where there is shown somewhat schematically the forward portion of an airplane 10 having a fuselage 12 and right and left wings 14. Each wing 14 has a leading edge 16, a trailing edge 18 and an outer edge tip portion 20. As illustrated in FIG. 1, there is shed from each outer edge portion 20 a vortex, indicated schematically at 22, which can be described as being a mass of rapidly spinning air.

Figure 2:
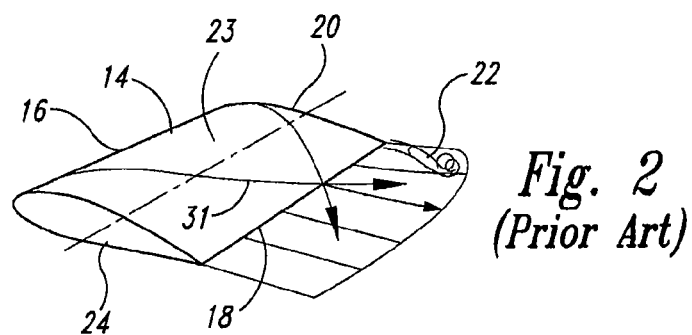
FIG. 2 is an isometric view of a section of an airfoil illustrating the flow pattern which results in the formation of the vortex.

To describe the manner in which a wing produces a vortex, reference is made to FIG. 2, which shows an outer section of the wing 14 having the leading and trailing edges 16 and 18 and the edge tip portion 20. The wing 14 has an upper aerodynamic surface 23, a lower aerodynamic surface 24, a spanwise axis 26 and a chord axis 28. For purposes of description, there will be designated an "alignment plane" which is generally horizontally aligned (with the airplane flying horizontally) and which is coincident with the spanwise axis 26 and the chord axis 28.

With further reference to FIG. 2, to describe briefly how the vortex 22 is formed in flight, there exists a pressure level differential between the upper and lower wing surfaces 23 and 24, and this results in a change in the direction (indicated at 31) of the spanwise velocity component across the surface of the trailing edge which separates the flow from above and from below the wing. This velocity gradient is the principal source of vorticity content with in the wake. The sheet of concentrated vorticity rolls up into two distinct counter-rotating vortex elements 22 that originate at the tips of the wing, as schematically shown in FIG. 1 and also indicated at 22 in FIG. 2.

Depending upon weather conditions, for large and heavy planes these vorticities are quite intense and they can persist for a relatively long time, which translates into relatively large distances, relative to the residual effect along its flight path. For example, the trailing wake of a relatively large transport airplane during approach might pose a danger to an airplane following in its flight path for about 1.5 minutes which corresponds to about 20 km distance in the spacing of the airplane. In a quiet atmosphere the vortices persist very long until their destruction through molecular and turbulent dissipation. Usually however, the mechanism that leads to the eventual vortex break up due to atmospheric perturbations is flow instability (often referred to as Crow instability, Crow, S.

C., "Stability Theory for a Pair of Trailing Vortices," AIAA Journal, Vol 8, No. 12. pp. 2172-2179, December 1970). The onset of instabilities is hastened by ambient turbulence, wind and atmospheric stratification. These sources of excitations trigger the generation of sinusoidal waves along the cores of the vortex elements. The subsequent process of nonlinear amplification results in the breakup of vortex elements and leads to their destruction. Relative to quiescent conditions, the perturbations due to atmospheric disturbances and the ensuing instabilities shorten the lifespan of the vortices. Unfortunately, these instabilities usually evolve rather slowly and do not result in flow conditions that allow practical reductions in airplane separation.

During take-off and landing, high-lift devices are deployed and the trailing wake consists of multiple vortex elements developed by these high-lift devices. In those configurations, the dynamics of the individual vortices are more complex, but the destabilization caused by atmospheric disturbances is still the leading mechanism of vortex decay.

The trailing vortices generated by large aircraft can be a severe atmospheric disturbance to airplanes that are flying into their path. This situation is especially acute during take-off and landing since the flight segments are formed in a relatively narrow corridor. Moreover, the swirling flow of the vortex 22 is very intense at low speed.

Figure 3:
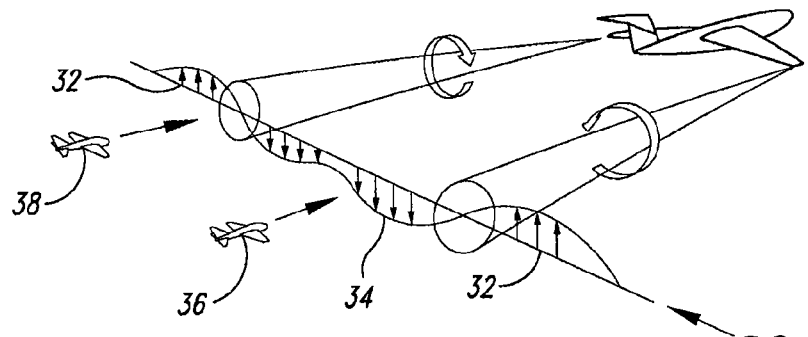
FIG. 3 is a somewhat schematic isometric view illustrating schematically the flow pattern of vortices generated and the effect of these on other aircraft.

These swirling flow patterns are illustrated somewhat schematically in FIG. 3, and it should be understood that FIG. 3 is not intended to be an accurate representation of the airflow associated with the vortex, but rather to show the overall pattern. It can be seen that at the outside portion of the vortex there is an up wash 32 and at the inside of the vortex there is a down wash 34. It can be seen that for an airplane 36 traveling between the two down wash zones 34, there is a loss of altitude (when landing) or a loss of rate of climb. For the airplane indicated at 38 that is traveling into the up wash 32, there can be imposed a roll moment on the airplane. For the airplane indicated at 40, moving transversely through the two vortices 22, there can be imposed substantial aerodynamic stresses on the airplane 40 by the sudden change in vertically oriented loads imposed on the airplane 40.

Figure 4:
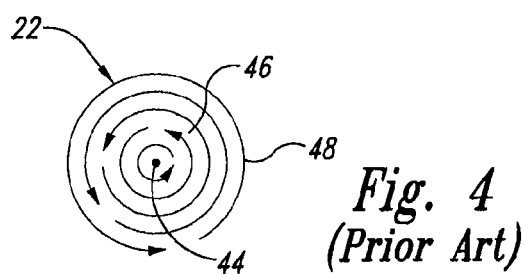
FIG. 4 is a cross sectional view of a typical vortex.

To facilitate the description of various aspects of these embodiments of the invention, the vortex that is generated from the wing tip is shown schematically in cross-section in FIG. 4, and shall be considered as having a vortex core 44, a main vortex flow region 46 surrounding the core, and an outer perimeter flow region 48 surrounding the main vortex flow region 46. Obviously, there are no sharp lines of demarcation between the vortex core 44, the main vortex flow region 46, and the perimeter flow region 48.

With the foregoing text being given as background information, there will now be a description of the embodiments of the invention. In the following description the term "airfoil" is meant to refer to the entire aerodynamic body, and it is not intended to mean a cross section or cross sectional configuration of the same. Also within the broader scope, it is meant to include various aerodynamic bodies, including a wing, trailing edge flaps, leading edge flaps or slats, winglets, control surfaces, etc.

The airfoil vortex dissipating system 50 of this embodiment along with its nozzle section 52, will be described in more detail later in this text with reference to FIGS. 6, 7, and 8. However, it is believed that a better understanding of the system 50 will be obtained by first giving a preliminary description of the function of this vortex dissipating system 50, and this will be done with reference to FIGS. 5A through 5D.

Figure 5A:
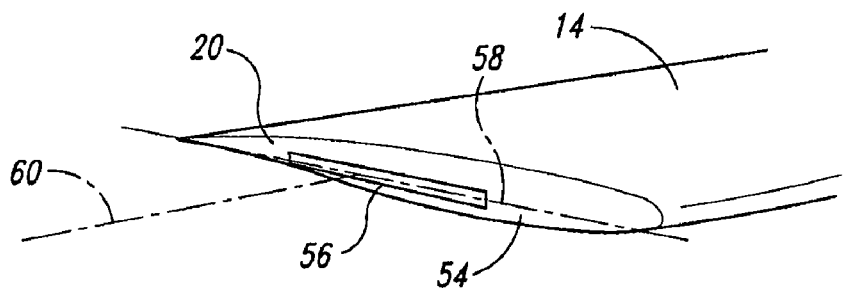
FIGS. 5A-5D are sequential views showing an air jet flow pattern of a initial embodiment of the present invention.

In FIG. 5A, there is shown the outer edge portion 20 of the right wing 14, and there is shown at 54 a nozzle alignment axis. At the location of that axis 54 there is a moveable coverplate or panel 56 which closes an air jet stream discharge opening, the perimeter boundary of which is indicated 58 in the FIG. 5A. There is also shown in FIG. 5A a lateral jet stream discharge axis 60 (hereinafter referred to as the lateral discharge direction 60) which has a substantial alignment component perpendicular to the nozzle alignment axis 54, and also has a substantial alignment component parallel to the aforementioned alignment plane which is defined by (and coincides with) the spanwise axis 28 and the chord axis 30. In the cruise mode of the airplane 10, the coverplate 56 can be in its closed position, and can be opened when the airplane is either landing or taking off and climbing.

Figure 5B:
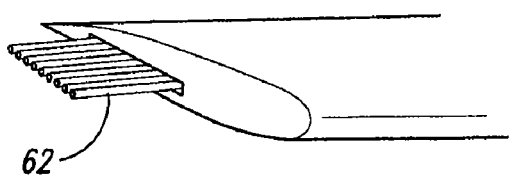
Figure 5C:
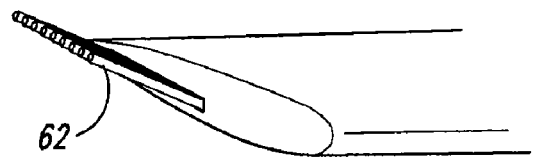

In FIG. 5B, there is shown the jet air stream 62 being discharged in a direction which is generally parallel to and also coincident with (or in proximity to) this lateral discharge direction 60. As indicated above, the discharge of the jet air stream 62 would normally occur only during the take-off or landing made. As will be disclosed in more detail later herein, the aforementioned nozzle section 52 can be operated so that the jet air stream 62 can be also discharged in a direction having an upward slant, as shown in FIG. 5C, and also a downward slant, as illustrated in 5D. Further, in the operating mode of this embodiment, the up-and-down movement between the positions of 5C and 5D can be done in different operating modes so that the jet air stream 62 rotates in up-and-down cycles at higher and lower frequencies. The effect of these is to contribute to the dissipation of the vortex 42, and this will be discussed in more detail later in this text.

Figure 6:
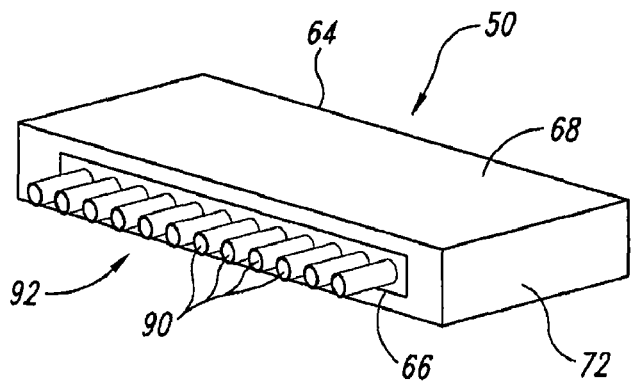
FIG. 6 is a somewhat schematic isometric view illustrating a nozzle section of an embodiment of the invention.
Figure 7:
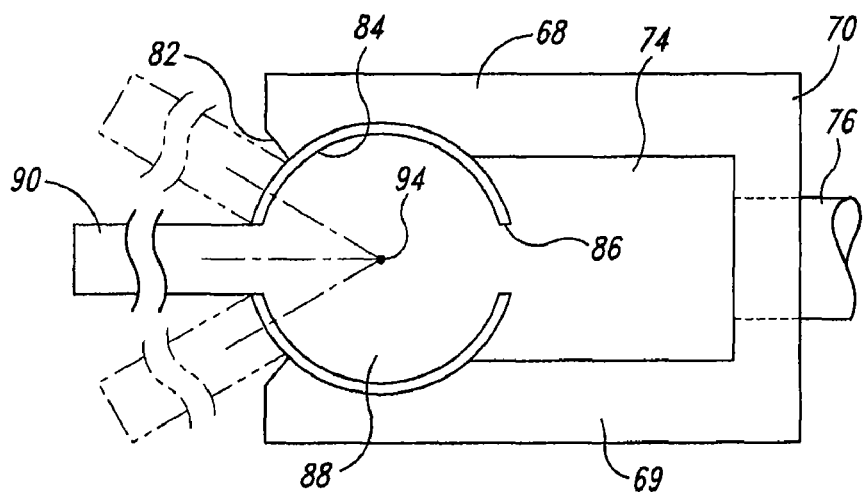
FIG. 7 is a sectional view taken along line 7-7 of FIG. 6.
Figure 8:
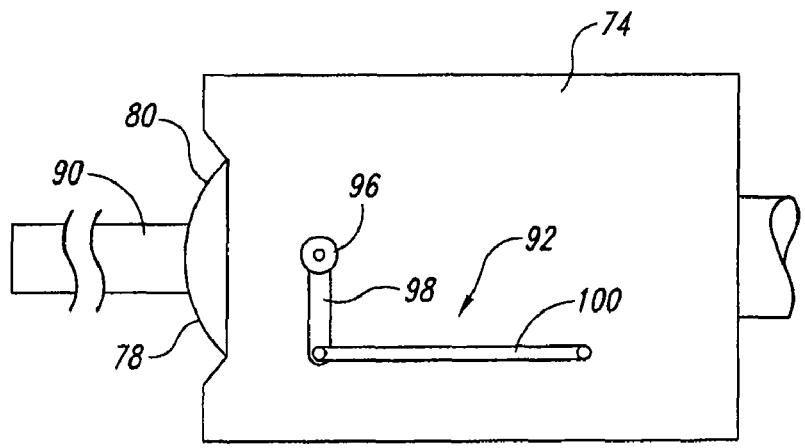
FIG. 8 is an end view of the nozzle section of FIG. 6.
Figure 9A:
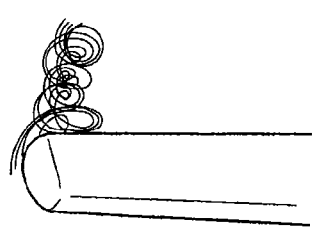
Figure 9B:
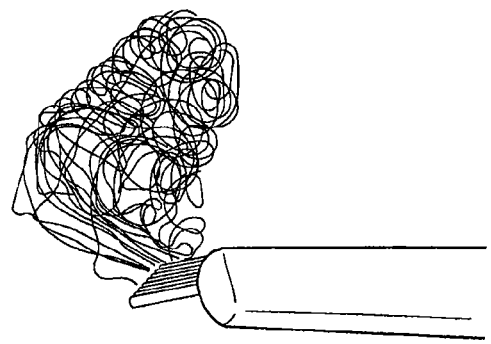
Figures 1, 9C:
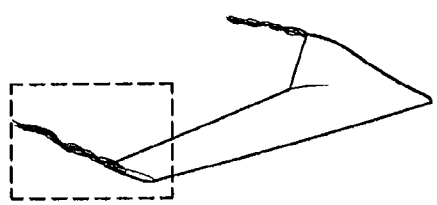
Figures 1, 9D:
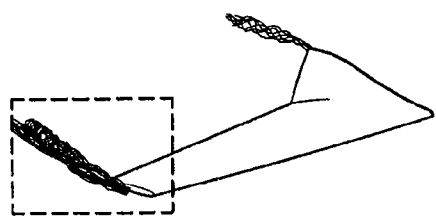
Figures 2, 9C:
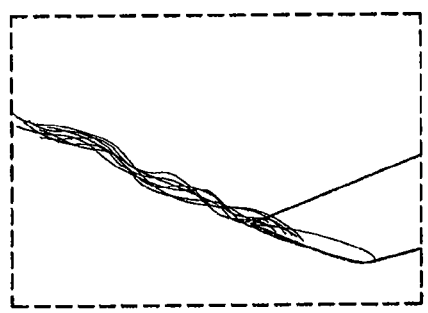
Figures 2, 9D:
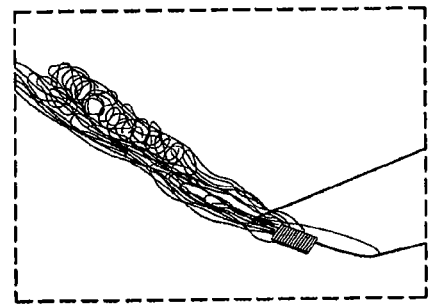
Figure 10A:
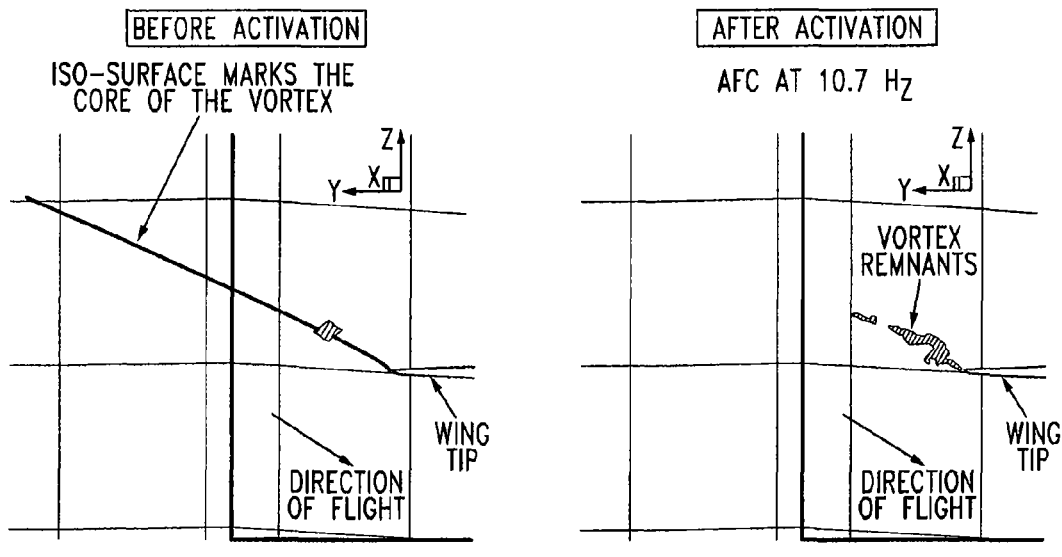
FIGS. 10A, 10B, and 10C display an iso-surface representing the vortex before activation of the apparatus and after activation where the operating frequency is 10.7 Hz.
Figure 10B:
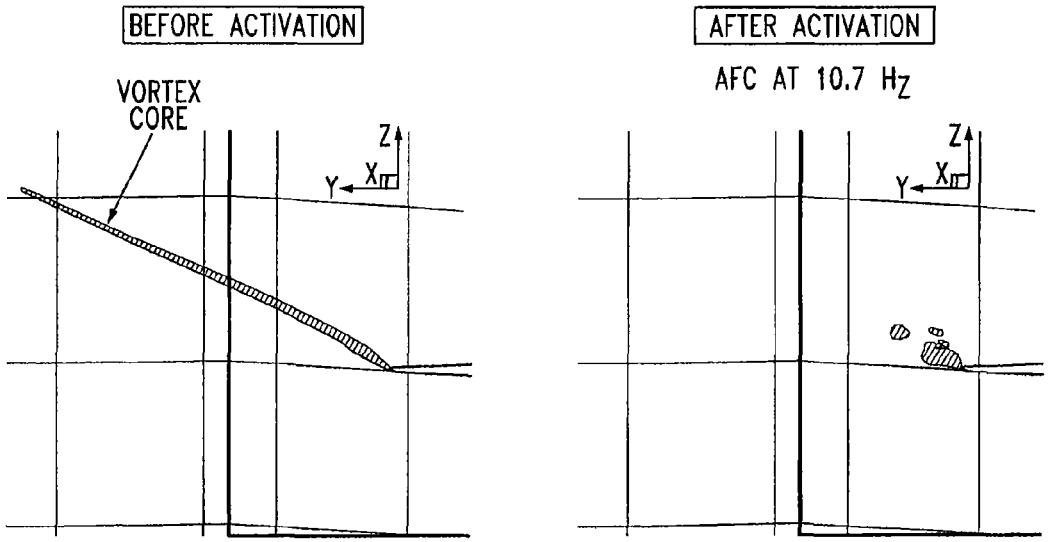
Figure 10C:
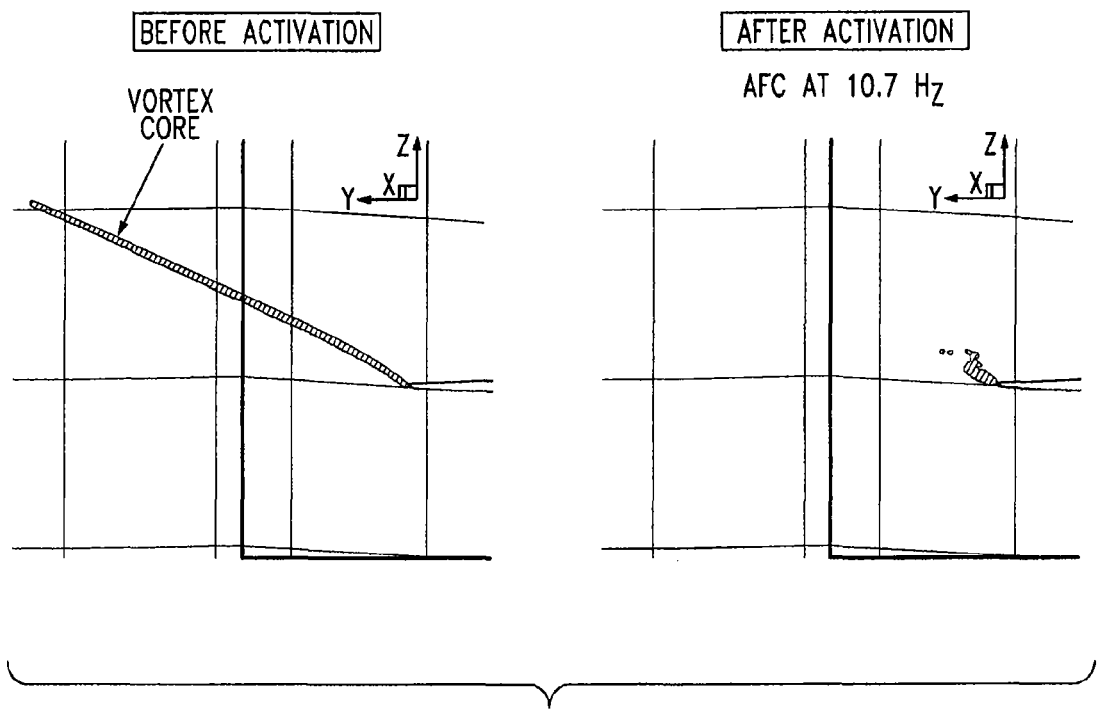

Reference is now made to FIGS. 6, 7, and 8 to describe the nozzle discharge section 52 in more detail. It is to be understood that FIGS. 6, 7, and 8 are somewhat schematic and are not intended to show an optimized structural configuration design, but rather to show a design having components which would perform the basic functions. In the situation where this design were to be actually implemented as part of an aircraft, then each of the components would be configured to match the design goals of being lightweight, structurally sound, functional and to accomplish the pressurizing, containment, and discharge of the jet air stream 62, and also to properly fit in the contours of the wing or other airfoil.

In FIG. 6, there is shown the basic components of the nozzle section 52 which are a housing section 64 (hereinafter called the housing 64) and a nozzle discharge section 66. As shown herein, the housing 64 is as a single elongate housing having upper or lower walls 68 and 69, respectively, a back wall 70 and end walls 72 that collectively define a pressurized plenum chamber 74. This housing 64 is positioned within the outer end portion 20 of the wing 14, and accordingly it can be contoured to fit properly within the confines of that portion of the wing 14.

There is a pressurized air inlet 76 which receives pressurized air from a suitable source. For example, the pressurized air could be bled from the compressor section of a jet engine or from some other source. Also, while the inlet 76 is shown is a single inlet, this could be arranged in manner of a manifold with multiple inlets or some other configuration.

The nozzle discharge section 66 has an overall elongate configuration and comprises a nozzle mounting member 78 which has the overall configuration of an elongate cylindrical wall 80, which fits snugly in an elongate forward end opening region 82 formed at the forward part of the housing 64. This end opening region 82 comprises two oppositely positioned cylindrically curved surfaces 84 which match the configuration of the cylindrical wall 80, with the curved surfaces 84 forming a substantially airtight seal with the cylindrical wall 80.

The elongate cylindrical wall 80 is closed at opposite ends, and has one or more rear openings 86 which open to the plenum chamber 74 of the housing 64 and open to a nozzle plenum chamber 88 that is defined by the cylindrical wall 80.

Located at the forward portion of the cylindrical wall 80 is a plurality of individual nozzle members 90, which collectively form a nozzle discharge portion 92 of the nozzle discharge section 66. These nozzle members 90 are shown in FIG. 6 to be aligned with one another at the lateral discharge axis 60, so that these collectively form the aforementioned jet air stream 62. Thus, when pressurized air is directed through the pressurized air inlet or inlets 76 into the plenum chamber 74 and from there into the nozzle plenum chamber 88, the pressurized air is discharged through these nozzle members 90 to form this jet air stream 62.

The cylindrical wall 80 is rotatably mounted in the cylindrical curved surfaces 84 that define the elongate forward end opening region 82 of the housing 64, with the axis of rotation being indicated at 94. As shown in the broken lines of FIG. 7, this enables the nozzle members 90 to be moved from a middle alignment location where the nozzles 90 are directed horizontally upwardly or downwardly to the broken line positions shown in FIG. 7. In this embodiment, the amount of upward rotation could be, for example, one-third of a right triangle (e.g., about 30 degrees) and downwardly through that same angular rotation, so that the total path of travel could be, for example about 60 degrees.

To move the nozzle members 90 to their various positions of angular orientation, a suitable actuating mechanism can be provided, such as shown schematically in FIG. 8 at 92. The nozzle mounting member 78 connects to a shaft 96 that connects to a lever arm 98 that is in turn moved by an actuating arm 100. In other embodiments, various other devices can be used to change the position of the nozzle mounting member 78, such as a bell crank, a gear drive, or an electric, pneumatic, or hydraulic positioning device. For purposes of brevity, these various design options will not be described in detail herein.

Also, there could be various arrangements to direct the pressurized air to the nozzle members 90. For example, the pressurized air inlet 76 could be connected directly to the nozzle mounting member 78, leading through the cylindrical wall 80, or possibly being attached by a rotary fitting to an end wall of the cylindrical mounting member 78. This arrangement would eliminate the present configuration of the housing 64 having the plenum chamber 74. With the constraints of having the nozzle assembly 50 being positioned on the outer edge portion 20 of the wing, it may be more desirable to have the housing 64 in a configuration which would be compatible with these space restraints and also provide a plenum chamber of sufficient volume to give the proper pattern of pressurized air discharge through the nozzle members 90.

With regard to positioning the nozzle assembly 52, the housing 64 and the nozzle mounting member 78 may be at a fixed location in the outer edge portion 20 of the wing 14. In this instance, when the vortex dissipating system 50 is to become operational, the aforementioned coverplate 56 is moved away from the air jet stream discharge opening 58 so that the nozzle members 90 are able to direct the air jet stream 62 through the opening 58 so that the jet air stream 62 is discharged into the vortex 42.

The coverplate or panel 56 can be moved from its covering position to an open position in various ways. For an example, this coverplate 56 could have a curved configuration and be movable so that it will slide out of the opening region and into a stowed position.

In airfoils such as the wings of the airplane, the outer end portion has in plan view, a moderate forward to rear outward curve so that at the mid-length of the curved outline of the end tip of the wing is positioned a short distance further outwardly from the fuselage. To place the nozzle members 90 relatively close to outer edge portion of the wing or other airfoil, the alignment position of the nozzle members 90 would be in a moderate curve. Therefore, the configuration shown in FIG. 6 could be modified to place these nozzle members 90 in a curve matching that of the outer edge of the wing or other airfoil, and yet be able to rotate upwardly and downwardly. To obtain this configuration, there are various options. For example, instead of making the nozzle mounting member 78 as a single structure extending the entire length of the housing 64, the nozzle mounting member 78 could be arranged in a plurality of individual segments which can be rotated about slightly different axes of rotation 64 so that these would match the outer curvature of the line of the wing tip more closely. Other arrangements would be available, and since these are well-known with those skilled in the art, these will not be elaborated on in this text.

As indicated earlier, when the airplane 12 is in the cruise mode the vortex dissipating system 50 is not used and remains concealed behind the coverplate 56 in the wing. Then the coverplate 56 would be moved to the open position and the vortex dissipating system 50 would generally be used in the takeoff and landing mode when it is highly desirable to hasten the decay of the two wing tip vortices.

With the jet air stream 62 being injected into the vortex 22 at this location and at the orientation and direction as described above, the entry of the jet air stream 62 into the vortex is at a location at which the core of the vortex is forming, with the laterally outward and upward curved vortex flow of the air from the lower surface of the airfoil taking place around the core of the vortex that is forming. The analysis done thus far indicates that the entry of the jet air stream 62 at this location is particularly effective in affecting the air flow in the developing vortex so that the overall effect is to begin the dissipation at a critical location so as to cause substantial hastening of the decay of the vortex.

Beyond this, there is, as described with reference to FIGS. 5A-5D the mode of operation where the nozzle mounting member 78 is rotated cyclically up and down so that the nozzle members 90 move to the upper position shown in FIG. 5C and then through the intermediate position of 5B down to the lower position of 5D and back up would lead to the position of 5C in continuous cycles.

The results achieved by this embodiment of the invention were simulated and analyzed by a computational fluid dynamics procedure. The effectiveness of the operation was evaluated for a wing mounted on a vertical wall with a free stream Mach number of 0.25 at an angle of attack at eight degrees, so as to represent final approach conditions. This mode of operation results in a coherent wake with strong tip vortices. It was found that when this embodiment of the present invention as described above is utilized, the flow is affected in a manner that the vortex is significantly diffused.

In the case where the nozzles 90 are moved together up and down in the range of 30 degrees above and 30 degrees below the nozzle alignment axis 74, at a frequency of 10.7 Hz (one cycle in 0.093 seconds), the effect on the vortex is represented by the streakline traces of the wing tip as illustrated in FIGS. 9A, 9B, 9C-1, 9C-2, 9D-1 and 9D-2. In FIGS. 9A, 9C-1 and 9C-2, there is no ejection of the jet air stream 62 into the vortex, and FIGS. 9B, 9D-1 and 9D-2 represent the vortex with the ejection of the jet air stream 62 in the up and down sixty degree motion at 10.7 Hz. These "snapshots" demonstrate that the intermittent mixing provided by the cyclic motion of the jet perturbs the flow in the tip region and alters the development of the trailing vortex by reducing the strength and diffusing it in the cross plane.

There are several measures that can be used to track vertical activity. The far field wake structure is presented in FIGS. 10A, 10B, and 10C, where the tip vortex is tracked by the total-pressure loss, the cross-flow and the streamwise component of the velocity. The vortex core is represented by iso-surfaces of the respective flow properties with the clear indication that the strength of the vortex is significantly reduced due to the moving jet.

Figure 11A:
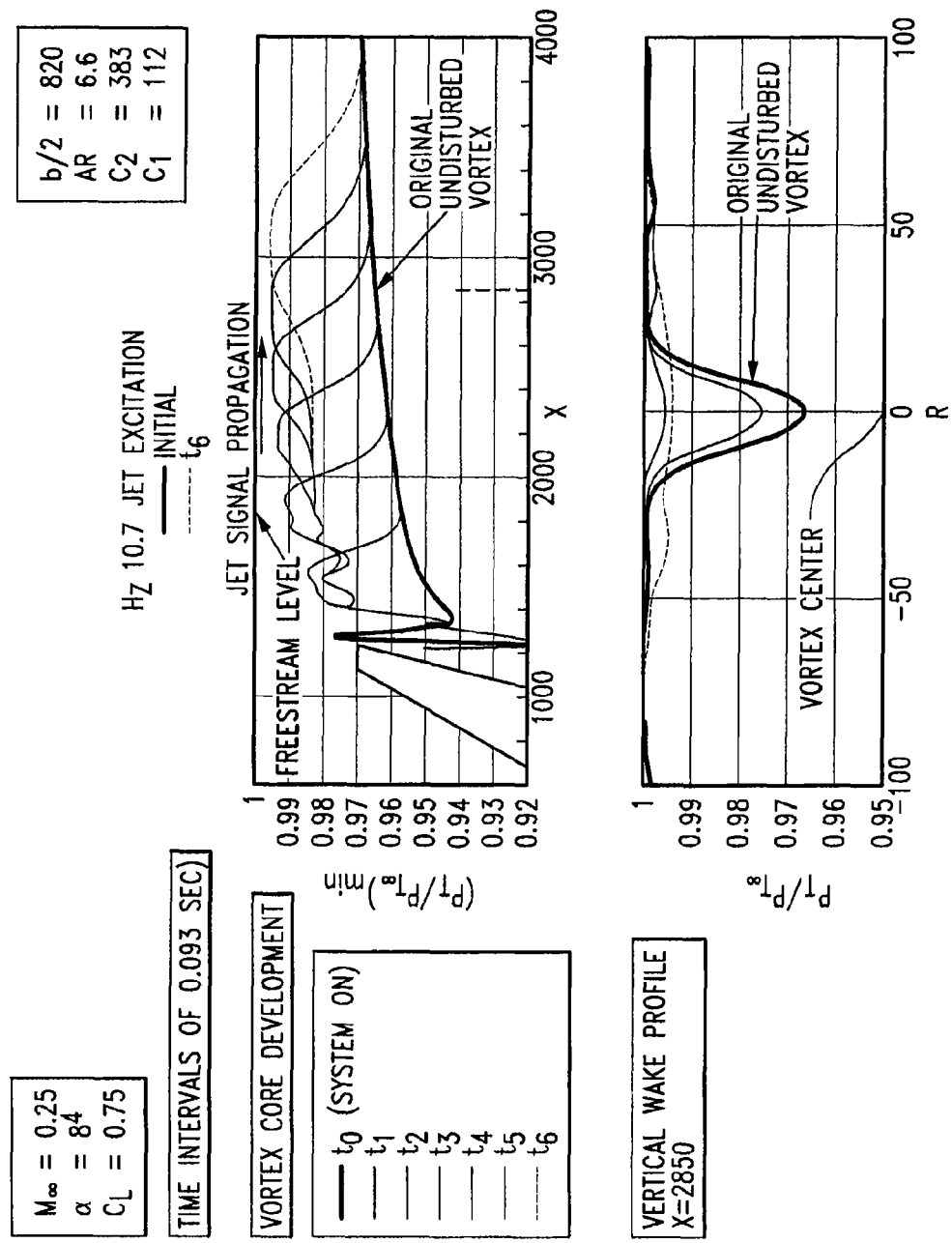
FIGS. 11A, 11B, and 11C are graphs presenting the development and dissipation of the vortex at the operating frequency of 10.7 Hz.
Figure 11B:
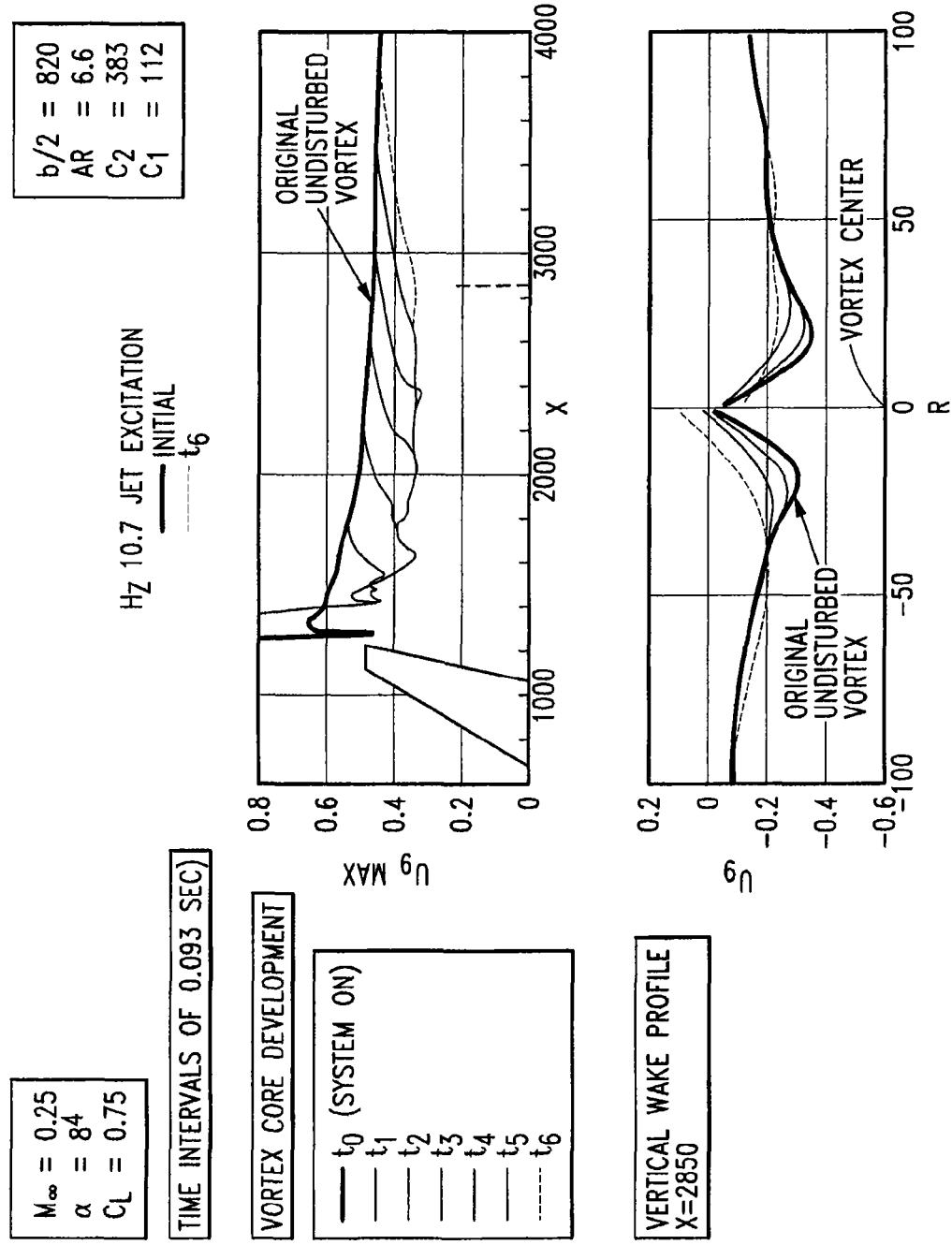
Figure 11C:
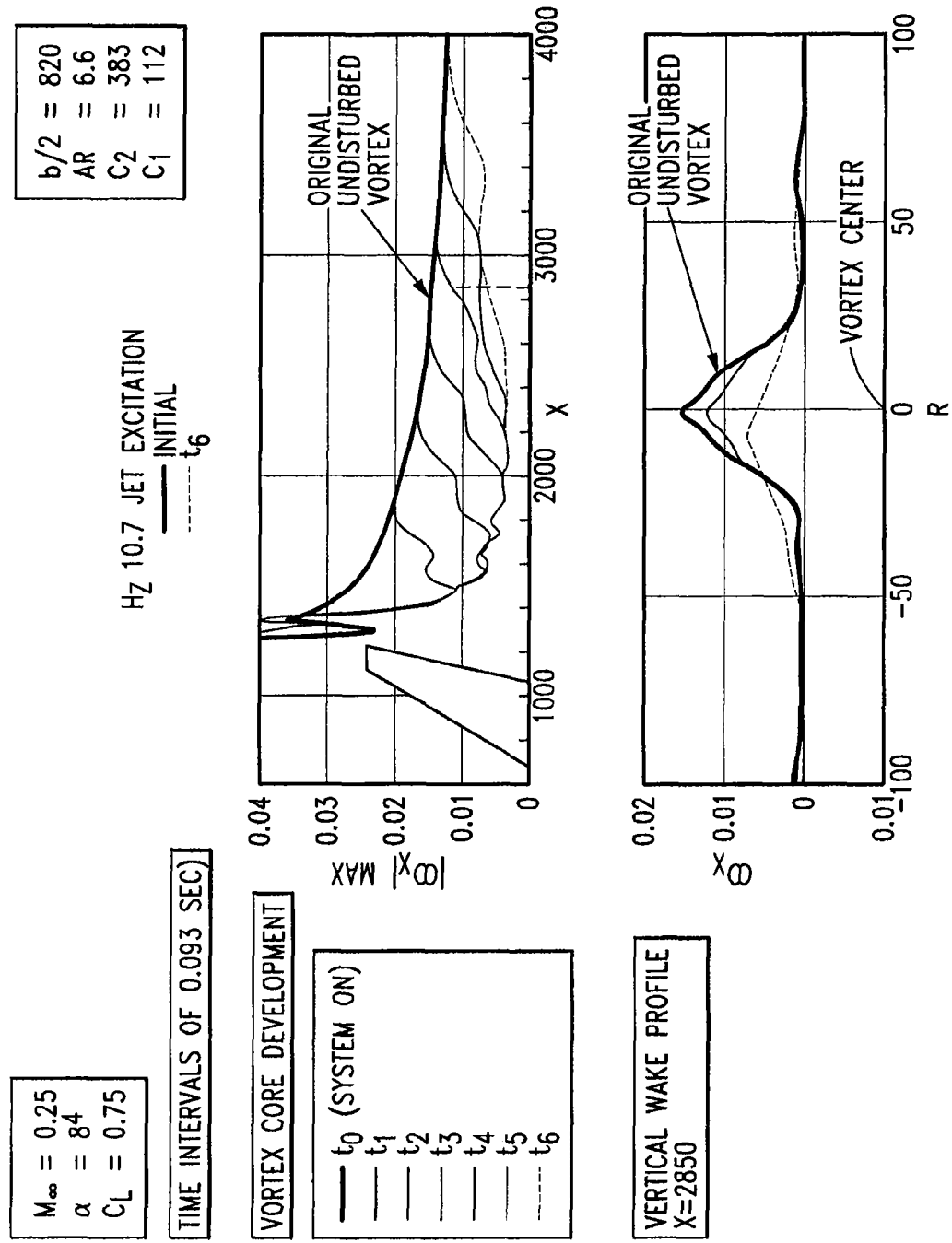

Diagnostics of flow development along the vortex at a frequency of 10.7 Hz core is shown in FIGS. 11A, 11B and 11C. Flow properties at a sequence of time intervals of 0.093 seconds from the instance of jet activation are shown along the vortex core in the upper plots. Also, the characteristics along a vertical line which passes through the vortex core at x=2850 are shown in the lower plots. The undisturbed vortex is described by the thick solid curves. The other curves represent the impact of the control mechanism on vortex characteristics at progressive time intervals with the signal traveling downstream (in the positive x direction). The front of the perturbation wave corresponds to the last snapshot in the time sequences and it is represented by the dashed curve. The dashed line describes the state of the vortex at 0.558 seconds from the start of jet application. The results indicate that the active system is very effective in reducing vortex strength as measured by the total-pressure loss, the cross-flow velocity (represented by the tangential component of the velocity) and the streamwise component of the vorticity.

Figure 12A:
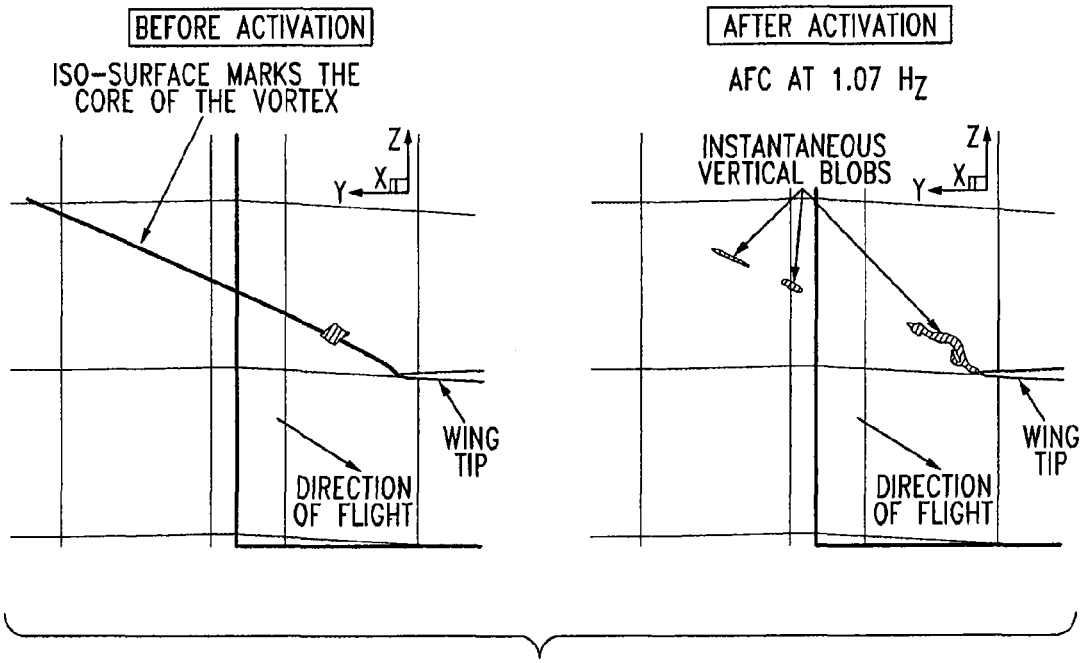
FIGS. 12A, 12B, and 12C are iso-surface representations similar to FIGS. 10A, 10B, and 10C, except that the operating frequency is 1.07 Hz.
Figure 12B:
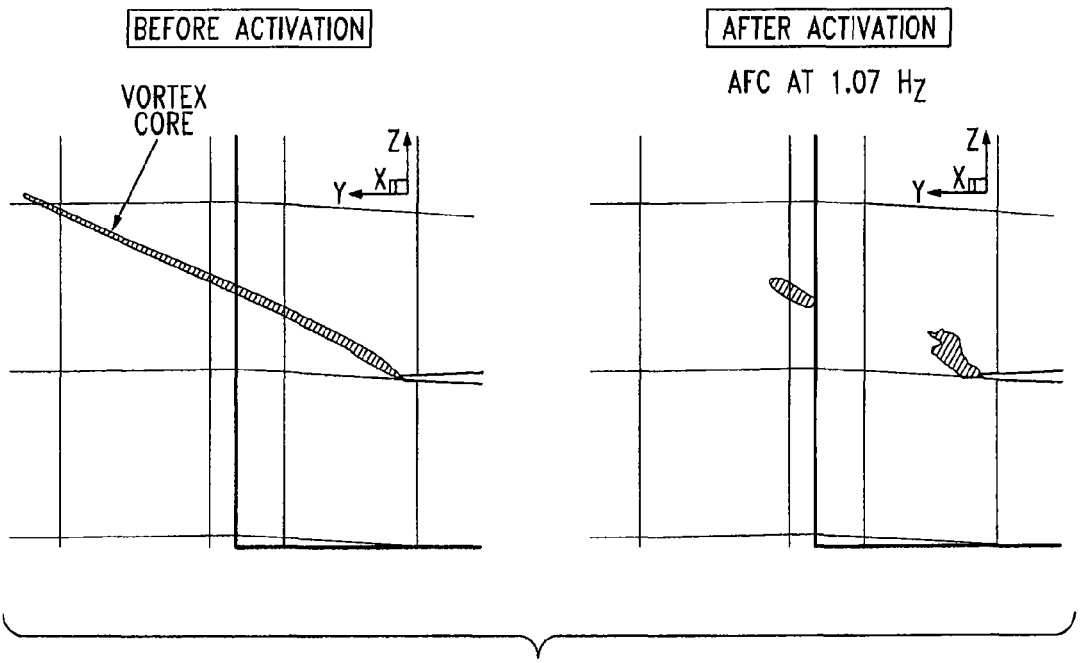
Figure 12C:
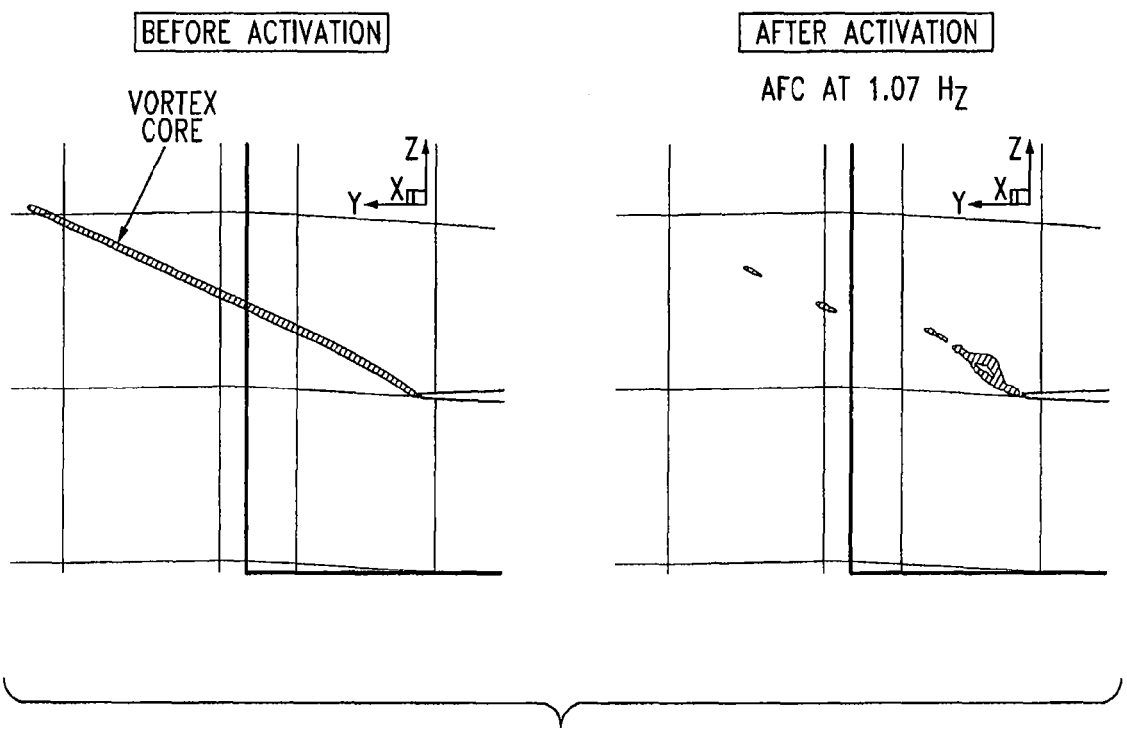

The up-and-down cycles of the nozzles 90 can also be effectively used at a lower frequency, such as approximately 1 Hz (i.e., one cycle of up-and-down motion in a little less than one second). The effect of this was analyzed by comparing the undisturbed vortex and comparing this with operating the vortex dissipating apparatus of the present invention at the 1.07 Hz frequency. The results of operating at 1.07 Hz are shown in FIGS. 12A, 12B, and 12C, which show that the oscillating jet air stream 62 introduces periodic disturbances along the vortex which propagate downstream. This continuous excitation results in the instability and destruction of the individual vortex segment.

Figure 13A:
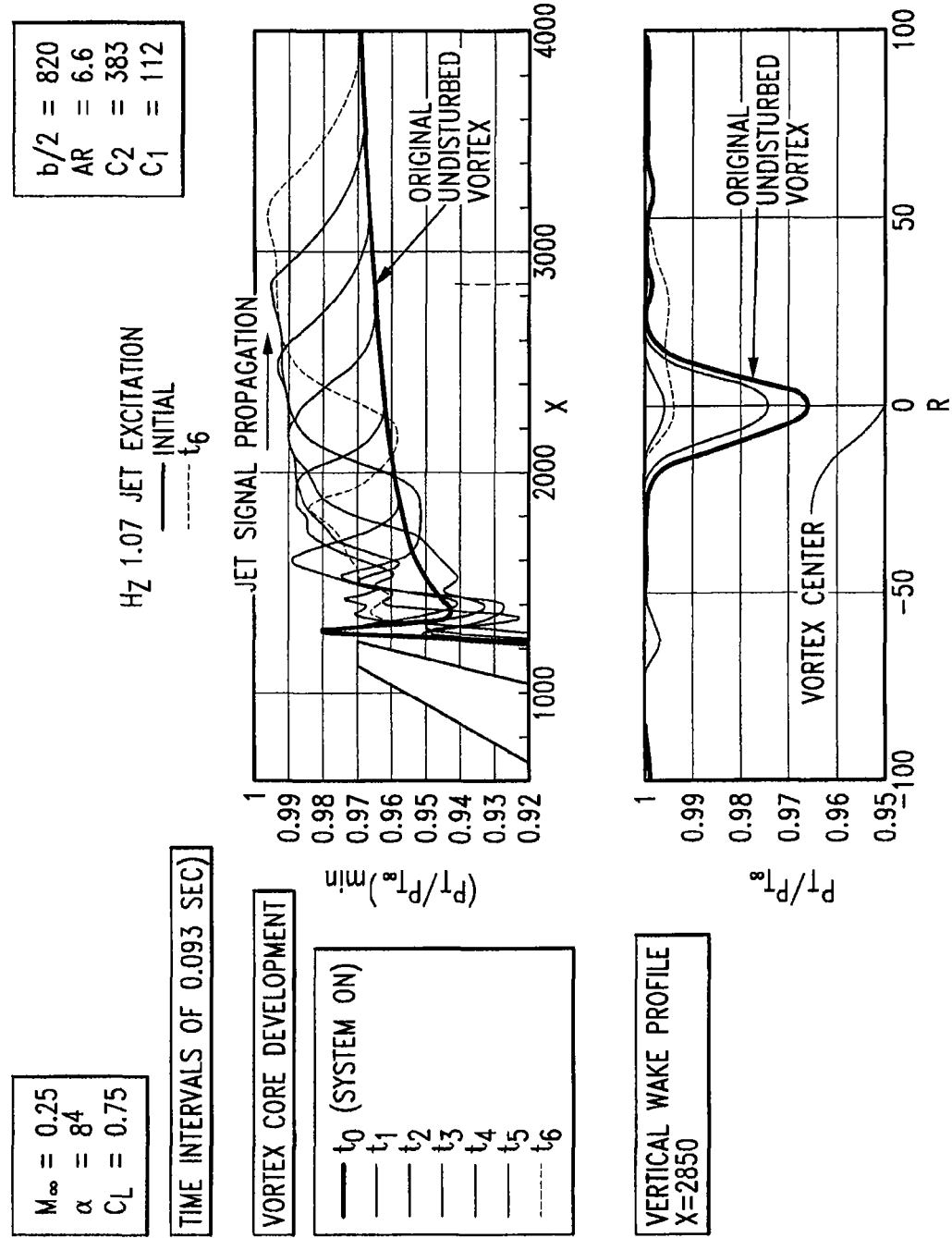
FIGS. 13A, 13B, and 13C are graphs similar to FIGS. 11A, 11B, and 11C, with the apparatus operating at a frequency of 1.07 Hz.
Figure 13B:
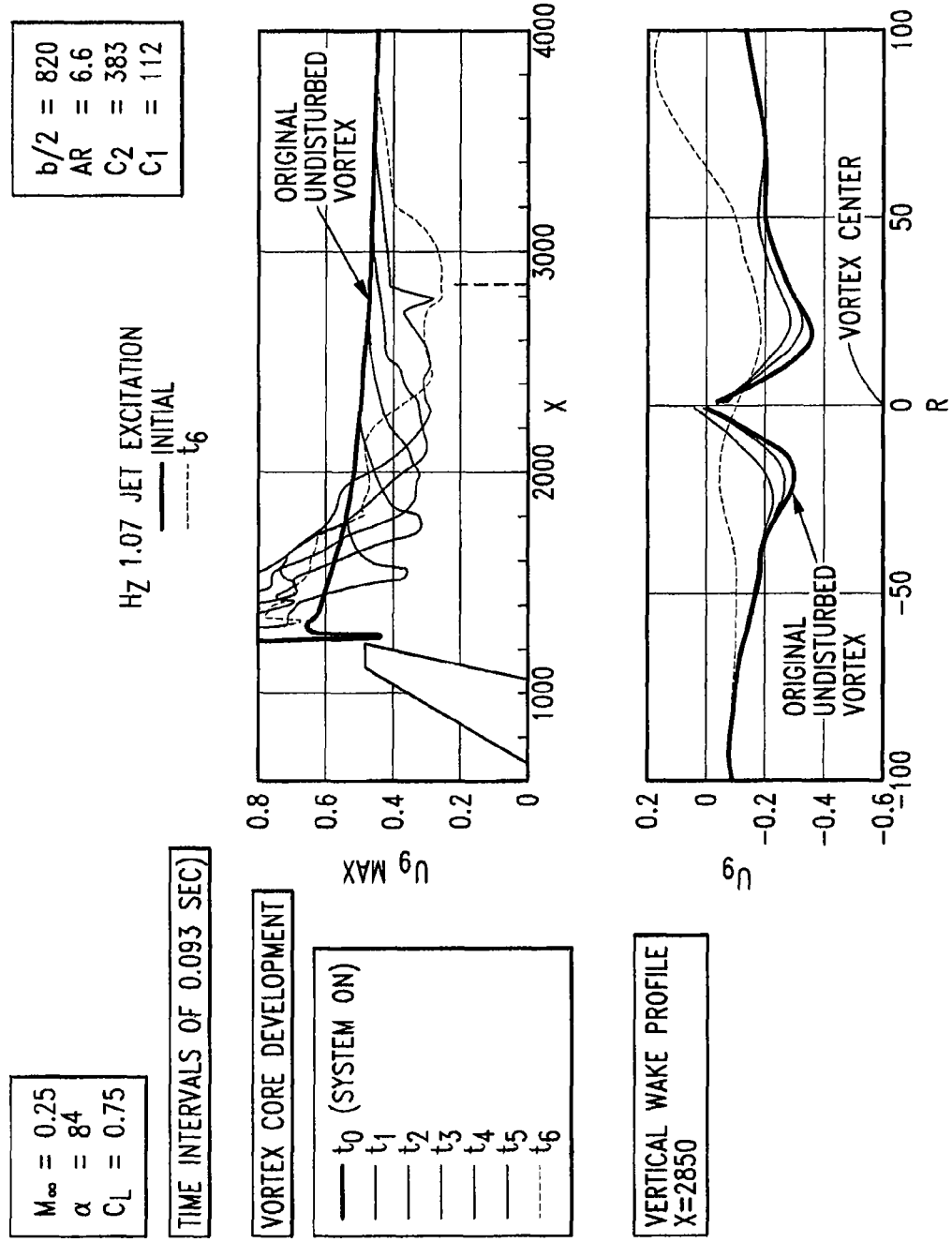
Figure 13C:
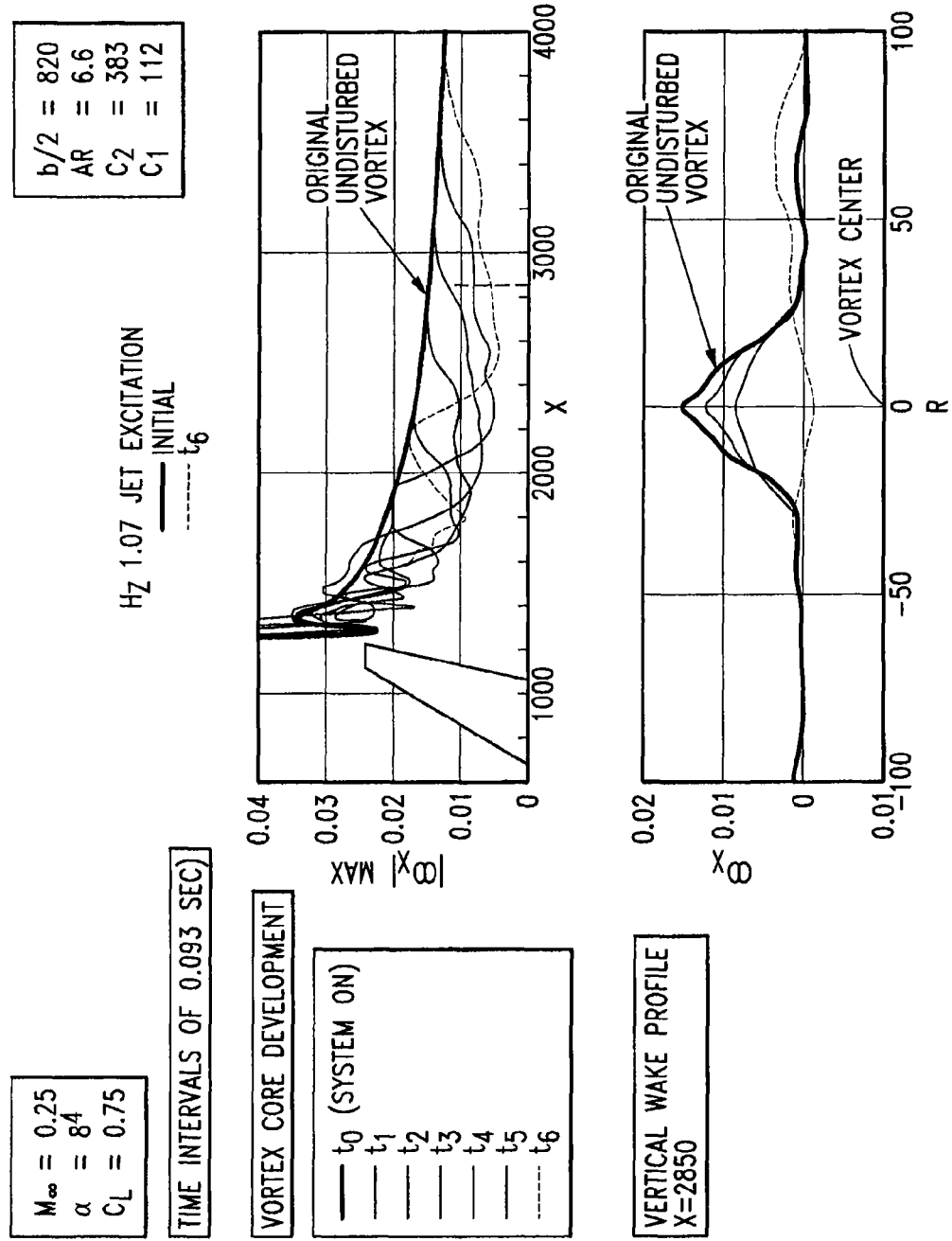

FIGS. 13A, 13B and 13C describe the perturbation wave along the vortex filament at various time intervals from the start of the jet application. It is shown that periodically, the total-pressure loss is reduced to less than 0.5%, which translates to about 85% reduction in the original vortex strength. The maximum tangential velocity is periodically reduced to about 50% of the original undisturbed vortex. Similarly, the maximum vorticity is being reduced by about two thirds. In practical terms, considering the substantial reduction in cross flow realized by using active control, a following aircraft will experience a bumpy flight but it will not be subject to a hazardous rolling motion.

Figure 5D:
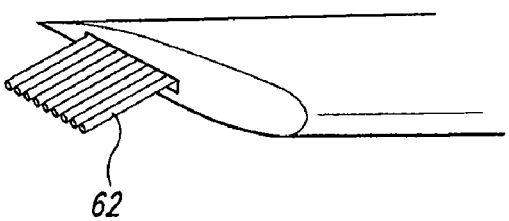

Reference is now made to FIGS. 14A, 14B, 14C, 14D and 14E. These are sequential views which illustrate a similar method as shown in FIGS. 5B, 5C and 5D, but with some differences. In this instance, the jet nozzles 90 are separated into forward and rear sections, with each forward and rear section being able to move upwardly and downwardly in a pattern different from the other set of nozzles 90.

Figure 14A:
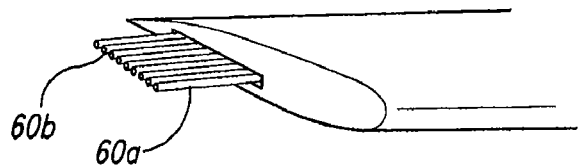
FIGS. 14A, 14B, 14C, 14D, and 14E are sequential views similar to FIGS. 5A-5D, but showing a further embodiment of the present invention in which the jet air stream has two jet air stream sections which move back and forth in out of phase relationship.
Figure 14B:
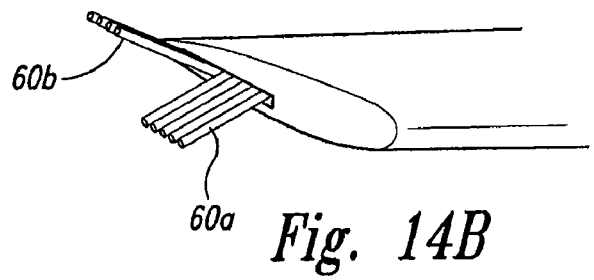
Figure 14C:
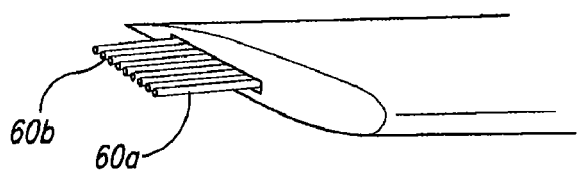
Figure 14D:
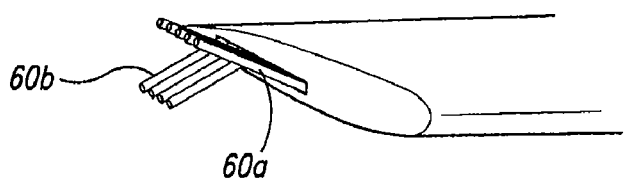
Figure 14E:
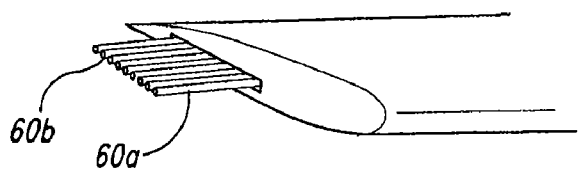

In FIG. 14A, there is shown a forward set of jet air stream portions 62a and a rear set of jet air stream portions 62b. Both of these are the same position as shown in FIG. 14A. As shown in FIG. 14B, the forward set 62a has moved downwardly 30 degrees, while the rear set 62b has moved upwardly 30 degrees. Then in 14C, the two sections of jet air stream portions 62a and 62b have reversed their direction of orientation and are moving more toward the horizontal position and in FIG. 14C and moving through the horizontal position but still rotating in opposite directions. As shown in FIG. 14D, they have moved to the position where the forward jet air stream portion 62a has moved upwardly 30 degrees, and the rear jet air stream portion 62b has moved downwardly 30 degrees. Then as shown in FIG. 14E, the two jet air stream portions 62a and 62b are moving at a reverse direction and are passing through the horizontal position at the same time, but traveling in opposite directions. Thus, this air jet stream oscillation forms what can be termed a scissors pattern.

Also, the angular orientation of the air jet stream can be shifted angularly from that shown in FIGS. 5A-5D. Instead of having the middle position be horizontal (i.e., parallel with the reference plane of the airfoil, the neutral position is slanted outwardly and downwardly at 30 degrees. Thus, in moving upwardly to the upper location, the jet air stream would be horizontal and in rotating to the lower position, the air jet stream would be slanting downwardly and outwardly at an angle of 60 degrees from the horizontal. It has been found that in this mode of operation, quite satisfactory results have been accomplished.

In at least some of the embodiments of the present invention, the nozzle section is positioned at an alignment location extending in generally a forward to rear direction at, or proximate to, the outer end portion of the airfoil. A length dimension of the region of where the air jet stream is discharged can be, for example, one third of a distance of chord length at the outer tip end portion of the airfoil, and in a broader range between approximately one quarter to one half of the chord length. However, within the broader scope of the present invention, this could be increased to, for example, 60%, 70%, 80%, 90% or 100% of the chord length, or it could be 35%, 30%, 25%, 20%, or conceivably 15% of the chord length at the outer tip of the airfoil.

The velocity of the jet air stream as discharged from the nozzle members 90 could be, for example, about Mach 0.62. However, depending upon other various factors, this could increase values up to Mach 0.7, 0.8, 0.9, or possibly greater. Also this could be decreased, for example, to Mach 0.6, 0.5, 0.4, 0.3, or possibly lower.

Also, the jet air stream with its back and forth motion could, within the broader scope of the embodiments be directed at different angular orientations and moved back and forth through different angular orientations and/or directed into other locations of the air flow forming the vortex.

In one arrangement of the vortex discharge portion 52 of the nozzle section 50, there is a plurality of nozzle members positioned along the alignment location. Each of the nozzles may be, for example, a simple conversion nozzle or a convergent/divergent nozzle if higher velocities are required. The cross section of the nozzle can be a circular or other suitable shape. The shape of the cross section of the nozzle can vary along nozzle length (for example, it can vary from a circular section to an elliptical section at the nozzle exit). The nozzle and distribution ducting downstream of the actuation system can be designed to minimize pressure losses, using techniques well known to those skilled in the art. However, within the broader scope of these embodiments, there could be a more elongate nozzle discharge portion more in the form of a continuous slot or slots having a greater length dimension than width dimension.

In one embodiment, the system is designed for a 600,000 pound airplane. In one design the calculated design parameters are as follows. The total chord wise length of the nozzle section is 43 inches, and it has 13 evenly spaced circular discharge orifices, each having a diameter of 3.2 inches. The velocity of the air that is discharged as the jet air stream is discharged at Mach 0.62.

In another design, for the same 600,000 pound airplane and with the discharge velocity being at Mach 0.62, the total length of the nozzle discharge section is 35 inches, and there are nine nozzle members each having an inside diameter of the discharge orifice of 3.9 inches.

In yet a third design, with the same airplane weight and air jet discharge Mach number, the total length dimension of the nozzle discharge section is 37 inches, and there are ten nozzle members, each having an inside diameter of the discharge orifice of 3.7 inches.

FIGS. 15A-25C illustrate vortex dissipation devices and expected resulting flow patterns in accordance with further embodiments of the invention. In an aspect of at least some of these embodiments, the nozzles that deliver the jet flows to break up or otherwise dissipate wing tip vortices can have a fixed configuration. Accordingly, the flow delivered from these nozzles can have a mass flow rate that varies with time, e.g., by having the flow pulsed through the nozzles. In another aspect of these embodiments, the time-varying nature of the flow emanating from these nozzles can be combined with the spatial variation of the nozzle positions, described above. Further details of manners in which the time-varying nature of the airflow through the nozzles may be controlled are described below.

Figure 15A:
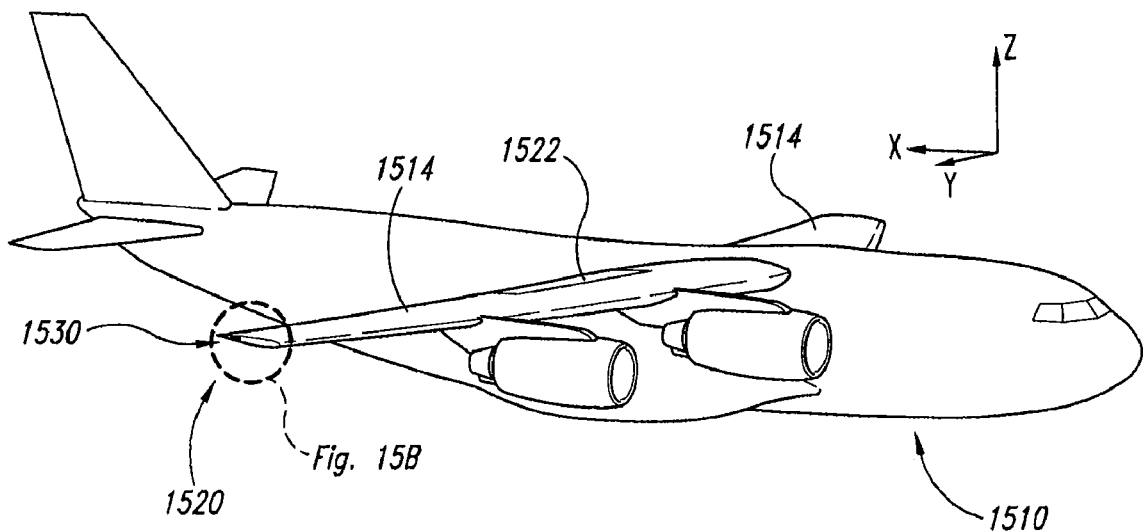
FIG. 15A is an isometric illustration of an aircraft having a vortex dissipation device configured in accordance with another embodiment of the invention.

FIG. 15A schematically illustrates an aircraft 1510 having wings 1514 on which vortex dissipation devices 1530 are positioned. In one aspect of this embodiment, the aircraft 1510 has a high-wing configuration, but the aircraft on which the vortex dissipation devices are installed can have any of a wide variety of other suitable configurations as well, including, but not limited to the configuration shown in FIG. 1. In any of these embodiments, the wings 1514 or other airfoils have oppositely facing upper and lower surfaces, a wing root at the wing body junction, and an outboard wing tip 1520. The vortex dissipation device 1530 can be mounted at or proximate to the outboard wing tip 1520 of each wing 1514. In other installations, the vortex dissipation device 1530 can be mounted to the tips of other airfoils, in addition to or in lieu of the wing 1514. Such other airfoils can include, for example, trailing edge devices (e.g., trailing edge flaps 1522, ailerons, flaperons or other deployable devices), leading edge devices (e.g., leading edge slats), aircraft control surfaces (e.g., aircraft elevators and/or horizontal stabilizers), rotorcraft blades, and/or canards. Further details of features of the vortex dissipation device 1530 are described below. The size, shape and configuration of many of these features can be tailored to the specific aircraft and airfoil on which the vortex dissipation device 1530 is installed. Accordingly, certain aspects of the devices and methods described on the following discussion and related Figures may have other arrangements in other embodiments.

Figure 15B:
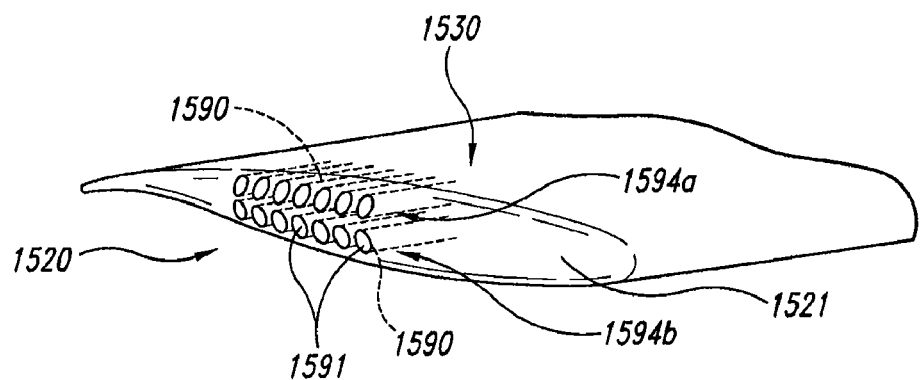
FIG. 15B is an enlarged isometric illustration of a portion of the aircraft shown in FIG. 15A.

FIG. 15B is an enlarged, isometric illustration of the wing tip 1520 and the vortex dissipation device 1530 shown in FIG. 15A. The wing tip 1520 can include a tip surface 1521 that can be flat in some embodiments, hemicylindrical in other embodiments, and curved in multiple dimensions and about multiple axes in still further embodiments. In any of these embodiments, the vortex dissipation device 1530 can include one or more nozzles 1590 (fourteen are shown in FIG. 15B for purposes of illustration), each having a nozzle orifice 1591. In a particular aspect of this embodiment, the nozzle orifices 1591 are positioned to be generally flush with the tip surface 1521. In other embodiments, the nozzle orifices 1591 can have other arrangements (e.g., slightly recessed from the tip surface 1521). The nozzle orifices 1591 can be located behind a movable door when the nozzles 1590 are not in use, in a manner generally similar to that described above with reference to FIG. 5A. For purposes of illustration, such a cover is not shown in FIG. 15B. The nozzle orifices 1591 can be arranged in particular patterns, for example multiple rows 1594 (shown in FIG. 15B as a first, e.g., upper, row 1594a and a second, e.g., lower, row 1594b). The flow of air or another gas directed through the nozzles 1590 can be controlled and varied in a time-dependent manner to hasten the dissipation of vortices emanating from the wing tip 1520, as described further below with reference to FIGS. 16A-22.

Figure 16A:
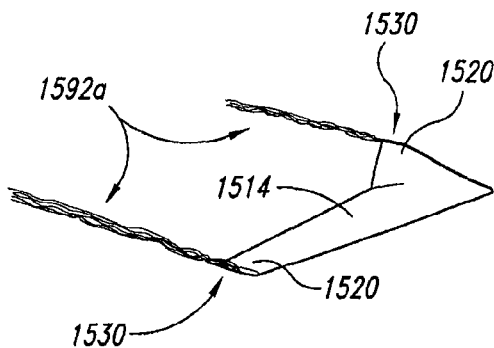
FIGS. 16A and 16B are schematic illustrations illustrating expected vortex behavior before and after activation of a system in accordance of an embodiment of the invention.
Figure 16B:
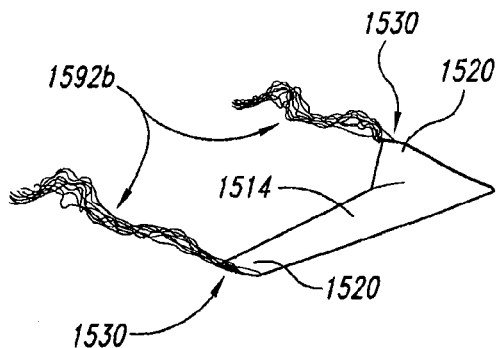

FIGS. 16A and 16B illustrate results of a computational fluid dynamic (CFD) simulation of a simplified version of the wings 1514 shown in FIGS. 15A-B. To simplify the CFD simulation, the fuselage of the aircraft 1510 (FIG. 15A) was eliminated, and one wing 1514 was analyzed as though it were mounted to a vertical wall. For purposes of illustration, the wings 1514 are shown together reflected about a plane of symmetry that corresponds to the vertical wall. This simplification is not expected to have a significant impact on the simulation of the wing tip vortices. The simulation results shown correspond to a freestream Mach number of 0.25 and an angle of attack of 8°.

FIG. 16A illustrates streaklines 1592a that correspond to the flow field resulting when the vortex dissipation device 1530 is inactive, i.e., when no fluid flow is actively directed outwardly through the nozzles 1590 (FIG. 15B). The streaklines 1592a represent the flow of particles that are initially positioned at the wing tips 1520. As shown in FIG. 16A, the flow field includes relatively strong wing tip vortices indicated by streaklines 1592a that are tightly wrapped about a core axis and proceed in a tightly wound helix downstream from the wing tips 1520.

FIG. 16B illustrates streaklines 1592b corresponding to the flow expected when pressurized air is provided through the nozzles 1590 (FIG. 15B). In FIG. 16B, flow is pulsed through all the nozzles 1590 simultaneously at a frequency of about 10 Hz. In one aspect of this embodiment, the pulsed flow is provided in accordance with a square-wave function having a pulse width of about 0.05 seconds and an inter-pulse interval of about 0.05 seconds. In other embodiments, the manner in which the flow is pulsed may be different, as is described in greater detail later. As is clear from FIG. 16B, it is expected that pulsing the airflow through the nozzles disturbs the vortices emanating from the wing tips 1520. As described above, it is expected that such a disturbance can reduce the potentially harmful effect of the vortices on following aircraft.

Figure 17A:
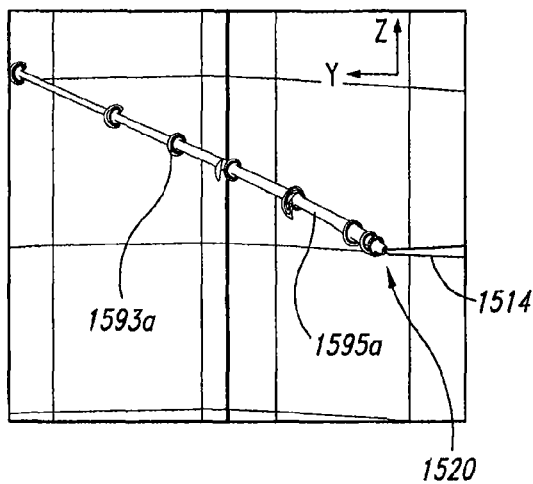
FIGS. 17A and 17B illustrate cross-flow velocity contours associated with the flow field initially shown in FIGS. 16A and 16B.
Figure 17B:
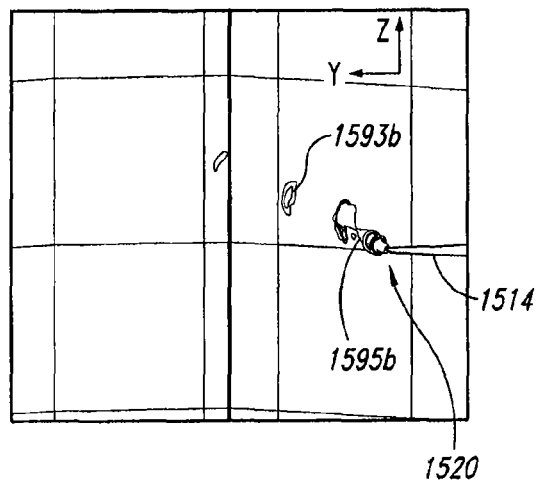

FIGS. 17A and 17B illustrate simulated cross-flow velocity contours at the same flow field conditions described above with reference to FIGS. 16A and 16B, respectively. In particular, FIG. 17A illustrates a vortex core 1595a and cross-flow contours 1593a taken at several station locations aft of the wing tip 1520 while the vortex dissipation device 1530 is inactive. The vortex core 1595a and strong cross-flow gradients persist for a significant distance downstream of the wing tip 1520.

FIG. 17B illustrates a vortex core 1595b and corresponding cross-flow contours 1593b for a condition at which flow is pulsed through the nozzles 1590 at 10 Hz, as described above with reference to FIG. 16B. In this case, the vortical flow is significantly disturbed, and breaks up relatively quickly (e.g., a short distance aft of the wing tip 1520). These predicted results further illustrate the expectation that pulsing the flow through the nozzles 1590 can significantly disturb and/or dissipate the wing tip vortices.

Figure 18A:
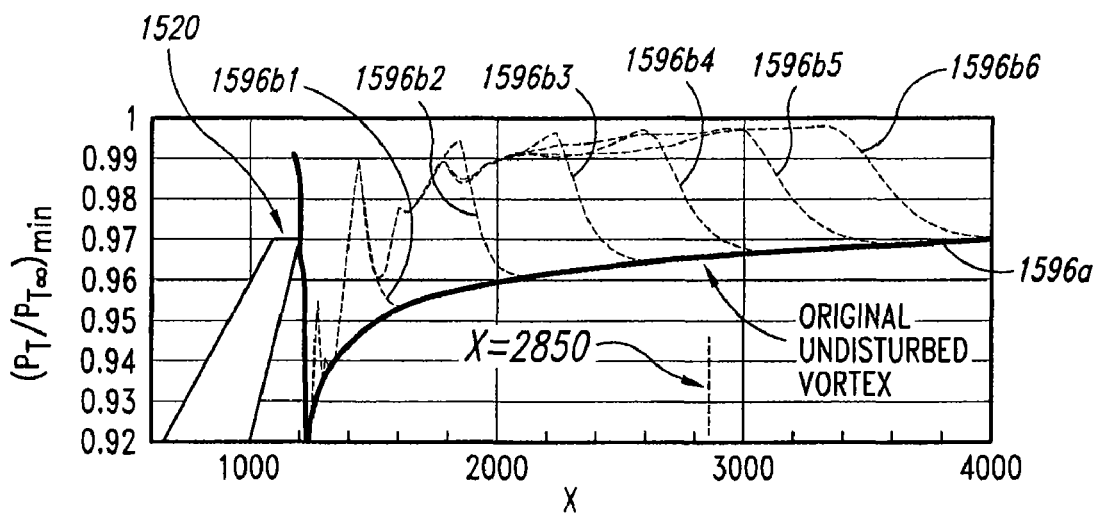
FIGS. 18A and 18B illustrate total pressure levels associated with the flow field shown in FIGS. 16A and 16B respectively.
Figure 18B:
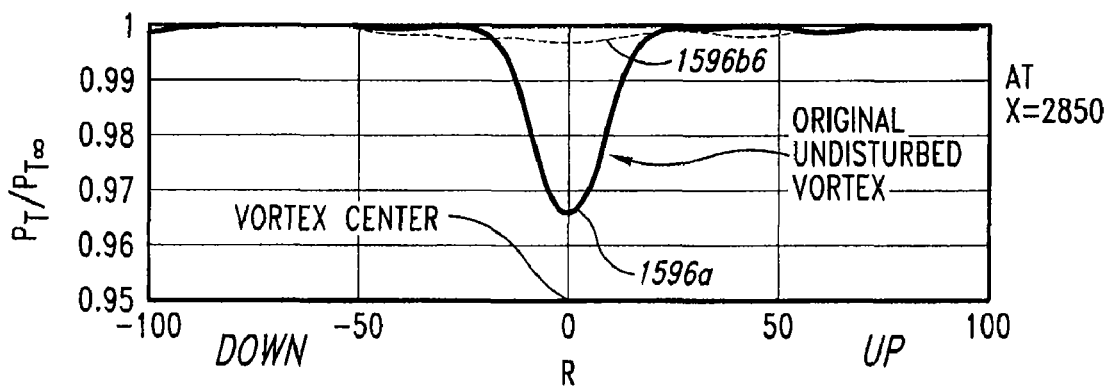

FIGS. 18A and 18B illustrate simulated total pressure levels at the same flow field conditions described above with reference to FIGS. 16A and 16B, at station locations aft of the wing tip 1520. FIG. 18A illustrates simulated total pressure levels for an undisturbed vortex, represented by line 1596a. FIG. 18A also illustrates total pressure levels for a disturbed vortex at successive 0.1-second time intervals after the activation of fluid pulses through the nozzles at a frequency of about 10 Hz (as represented by lines 1596b1-1596b6). Accordingly, FIG. 18A indicates that expected total pressure levels approach freestream total pressure conditions (e.g., a total pressure ratio of about 1.0) much more rapidly than does the original undisturbed vortex indicated by line 1596a.

FIG. 18B illustrates simulated total pressure levels at a particular vertical station behind the wing tip 1520. Solid line 1596a represents the total pressure level of the undisturbed vortex. Dashed line 1596b6 represents the total pressure level 0.6 seconds after the activation of fluid pulses through the nozzles at a frequency of about 10 Hz. Accordingly, FIG. 18B further illustrates the rapidity (0.6 seconds) with which the vortex dissipates and total pressure levels approach those associated with freestream conditions.

Figure 19:
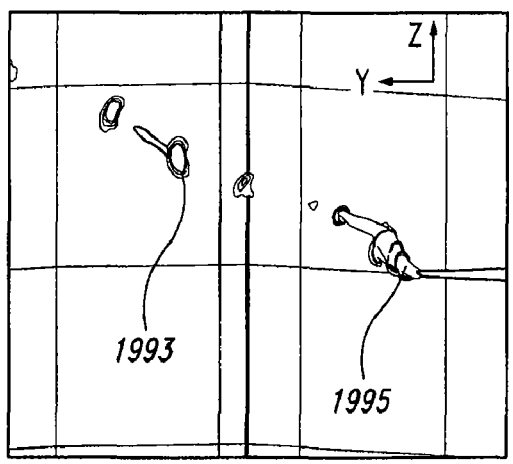
FIG. 19 illustrates expected cross-flow velocity contours associated with a flow field after activation of a system in accordance with another embodiment of the invention.

In other embodiments, the flow through the nozzles can be varied in manners other than the 10 Hz pulses described above, while still achieving significant vortex dissipation. For example, FIG. 19 illustrates expected results when flow through the nozzles is pulsed at 1 Hz (rather than 10 Hz), with a pulse width and inter-pulse interval of 0.5 seconds. FIG. 19 illustrates a vortex core 1995 and cross-flow contours 1993. A comparison of the vortex core 1995 shown in FIG. 19 with the vortex core 1595b shown in FIG. 17A indicates the significant ability of even relatively low frequency pulses to dissipate the vortex flow emanating from the wing tip 1520. A comparison of the cross-flow contours 1993 shown in FIG. 19 with the cross-flow contours 1593 shown in FIG. 17A further substantiates this expected result.

It is expected that, in at least some embodiments, high-frequency and low-frequency pulses may affect the wing tip vortices in different manners. For example, it is expected that high-frequency pulses may tend to perturb, break up and/or otherwise disrupt the wing tip vortices at or very near the wing tip 1520. Conversely, it is expected that lower frequency pulses may introduce perturbations into the flow at the wing tip, and that these perturbations may develop over a longer period of time, but still ultimately result in the disruption and/or break-up of the vortices. In a particular example, a comparison of FIG. 17B with FIG. 19 indicates that the vortices may break up more closely to the wing tip 1520 and in a steady fashion when subjected to relatively high frequency pulses (FIG. 17B). The vortices that may break up over a longer period of time (and therefore distance) in an unsteady fashion when subjected to lower frequency pulses (FIG. 19). In either arrangement, it is expected that the pulses dissipate, perturb, break up, and/or otherwise reduce the effect of the wing tip vortices.

The location of the particular nozzle orifices through which airflow is provided at any point in time may be varied, in addition to varying the amount of flow through any given nozzle. For example, in the simulation described above with reference to FIG. 19, flow was provided to the first and second rows 1594a, 1594b (FIG. 15B) in an alternating manner. Accordingly, the nozzles 1590 in the first row 1594a were pulsed at 1 Hz, with a 0.5 second pulse width and a 0.5 second inter-pulse interval, and the nozzles 1590 in the second row 1594b were also pulsed at 1 Hz with a 0.5 second pulse width and inter-pulse interval in a manner that was staggered by 0.5 seconds with respect to the pulses provided by the first row 1594a. In other words, when flow pulses were provided to the nozzles 1590 in the first row 1594a, the nozzles 1590 in the second row 1594b were inactive, and vice versa. It is believed that, in at least some instances, providing flow alternately to the first and second rows 1594a, 1594b can more effectively perturb the wing tip vortices.

Figure 20A:
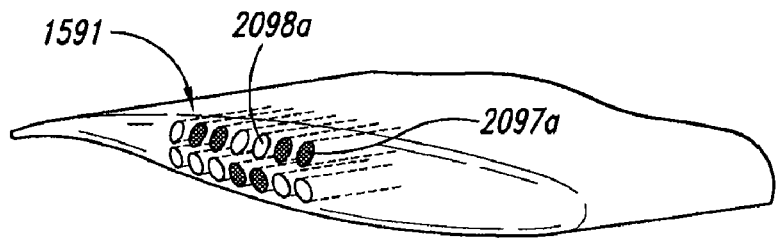
FIGS. 20A-20D illustrate active and inactive nozzles configured in accordance with several embodiments of the invention.
Figure 20B:
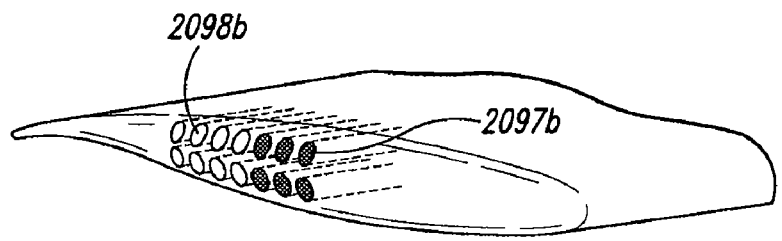

FIGS. 20A-20D illustrate representative arrangements in accordance with other embodiments in which different nozzles provide airflow at different times. FIG. 20A illustrates the nozzles 1591 with a "checkerboard" pattern of open nozzles 2098a and closed nozzles 2097a. FIG. 20B illustrates another arrangement in which closed nozzles 2097b are located forward of open nozzles 2098b. In one aspect of either embodiment, the configuration of open and closed nozzles 2098b, 2097b can be alternated to disrupt the wing tip vortices. In other embodiments, it may be determined that having some nozzles (e.g., the aft nozzles) open may be particularly beneficial at some flight conditions, and having other nozzles (e.g., the forward nozzles) open may be particularly beneficial at other flight conditions. Accordingly, the selection of open and closed nozzles may be made in a manner that depends upon the flight regime of the aircraft. In other embodiments, the nozzles may alternate between open and closed states in different manners. In any of these embodiments, flow may be pulsed through the nozzles 1591 in a time-varying manner that is superimposed upon the time-varying manner with which nozzles switch from being active to being inactive. Accordingly, the frequency with which flow is pulsed through the active or open nozzles may be the same as, greater than, or less than the frequency with which the nozzles alternate between active and inactive states.

Figure 20C:
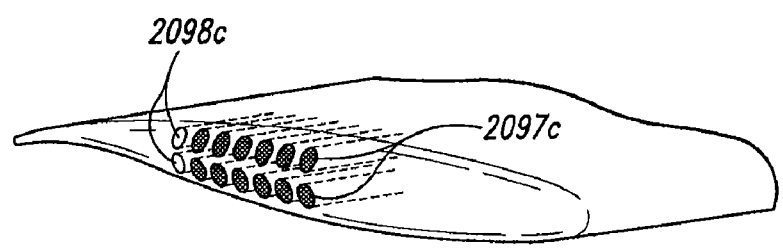
Figure 20D:
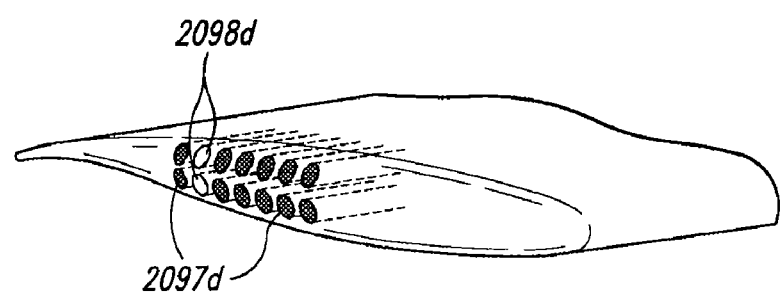

FIGS. 20C and 20D illustrate a manner of varying the flow through the nozzles so as to create a traveling "wave" of nozzle flow at the wing tip 1520. For example, FIG. 20C illustrates two active nozzles 2098c positioned aft, with the remaining inactive nozzles 2097c positioned forward, at time $T_0$. At time $T_1$ (illustrated in FIG. 20D) the active nozzles 2098d have shifted one column forward from the arrangement shown in FIG. 20C, and the inactive nozzles 2097d are now positioned both forward and aft of the active nozzles 2098d. The location of the active nozzles 2098d can continue to shift sequentially forward in a similar manner until the forward-most nozzles are open. At this point, the "wave" of active nozzles can restart with the aft-most row of nozzles, or the wave can reverse and travel in the aft direction.

It will be appreciated that the number of nozzles, the location of the nozzles, the timing of pulses through the nozzles, and/or a variety of other factors can be selected and/or changed in different arrangements. The factors that drive the selection of these parameters can include (but are not limited to) the type of aircraft on which the nozzles are installed (e.g., fixed wing, or rotorcraft), the particular flight condition at which the aircraft is flying, the shape and configuration of the airfoil in which the system is installed, and/or the desired degree to which the decay rate of the tip vortices is to be accelerated.

Figure 21A:
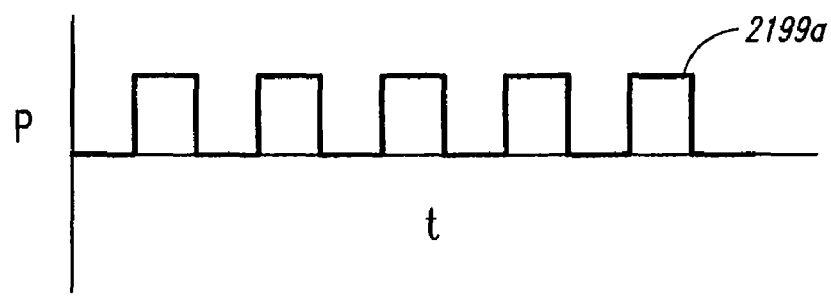
FIGS. 21A-21D schematically illustrate manners for pulsing fluid flow through nozzles in accordance with several embodiments of the invention.

FIGS. 21A-21D illustrate representative pulse profiles in accordance with which the flow through any given nozzle may be varied. For example, FIG. 21A illustrates a pulse profile 2199a having a step function. The width of each step (e.g., the time during which flow is passing through the nozzle) and the complementary inter-pulse interval (e.g., the time during which flow is not flowing through any given nozzle) can be varied in a manner selected to produce particular results. For example, in an embodiment shown in FIG. 21A, the pulse width and inter-pulse interval are the same, while in other embodiments, the pulse width and inter-pulse interval can be different.

Figure 21B:
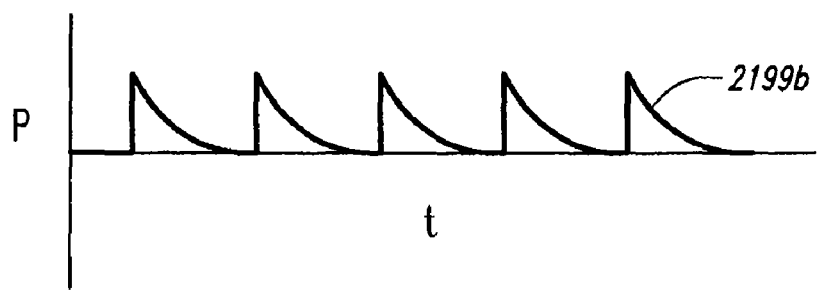
Figure 21C:
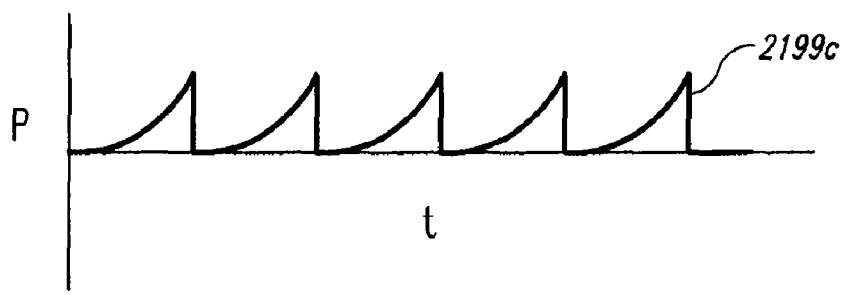
Figure 21D:
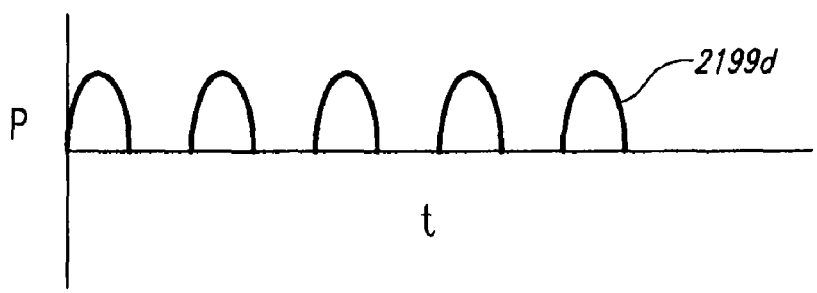

FIG. 21B illustrates a pulse profile 2199b having a step increase in flow and a subsequent gradual decrease in flow, followed by an immediate step increase once the flow rate decreases to zero. FIG. 21C illustrates a pulse profile 2199c in which the increase in flow rate is gradual and the decrease is a step function. As is also shown in FIG. 21C, the pulse profile 2199c can include an inter-pulse interval in which no flow is ejected through the corresponding nozzle. FIG. 21D illustrates a pulse profile 2199d having a sinusoidally varying pulse flow rate.

The arrangements shown in FIGS. 15A-21D and the associated discussion provide representative examples of arrangements that may be used to disrupt the vortical flow forming at the tips of airfoil devices. The location and/or manner with which flow is ejected from these tip regions may be selected and/or varied in other manners in accordance with further embodiments of the invention.

Figure 22:
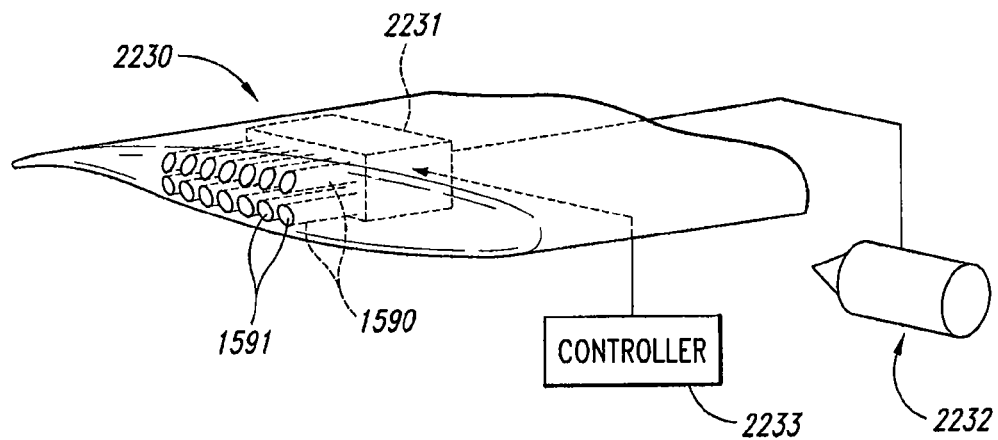
FIG. 22 is a partially schematic illustration of an aircraft system that includes a vortex dissipation device configured in accordance with another embodiment of the invention.

FIG. 22 illustrates an arrangement of a vortex dissipation device 2230 configured in accordance with an embodiment of the invention. The vortex dissipation device 2230 can include the nozzles 1590 and orifices 1591 arranged in a manner generally similar to that described above with reference to FIG. 15A. In other embodiments, the arrangement and/or configuration of the nozzles can be different. In any of these embodiments, the vortex dissipation device 2230 can include a valve device 2231 that selectively directs flow or inhibits flow through any of the nozzles 1590. In a particular aspect of this embodiment, the valve device 2231 can be a fluidic device that uses changes in pressure to open and close the corresponding orifices. The changes in pressure can be provided by a corresponding fluidic or pneumatic control valve arrangement and need not include moving parts at the nozzle itself to open or close the nozzles. Suitable devices are available from Honeywell, Inc. of Morris Township, New Jersey. In other embodiments, other suitable fluidic, mechanical, and/or electromechanical valves can be incorporated into the valve device 2231.

In any of the foregoing embodiments, the relatively high pressure air ejected through the nozzles 1590 can be provided by a high pressure air source 2232. The high pressure air source 2232 can include a compressor stage of one of the aircraft engines (e.g., a primary engine or auxiliary power unit). In other embodiments, the air provided to the nozzles 1590 can be pressurized by a separate source, for example, an electrically driven compressor.

In any of the foregoing embodiments, the vortex dissipation device 2230 can further include a controller 2233 that is operatively coupled to the valve device 2231, and that can be configured to direct signals to the valve device 2231 that instruct the valve device 2231 when and how to regulate the flow to each nozzle 1590. In particular embodiments, the controller 2233 can include a computer system. Accordingly, many of the directions provided by the controller 2233 may take the form of computer-executable instructions, including routines executed by a programmable computer. The term "computer" as generally used herein, refers to any data processor and can include multi-processor systems, processor-based or programmable consumer electronics, network computers, mini-computers, hand-held devices and the like. Program modules or subroutines may be located in local and remote memory storage devices, and may be stored or distributed on computer-readable media, including magnetic or optically-readable or removable computer disks, as well as distributed electronically over networks. Accordingly, the controller 2233 can be programmed to vary the manner with which flow is provided through the nozzles 1590 in a particular, pre-set manner that may in some cases be adjusted by the operator. The controller 2233 can be coupled to other aircraft systems so as to automatically change the characteristics of the flow provided through the nozzles in a manner that depends upon the particular flight regime in which the corresponding aircraft is flying. For example, the characteristics of the flow can be automatically changed depending on whether the aircraft is at a high-speed cruise condition, or a low-speed approach or take-off condition. When the nozzles 1590 are configured to move, the controller 2233 can also be configured to direct the movement of the nozzles 1590.

Figure 23:
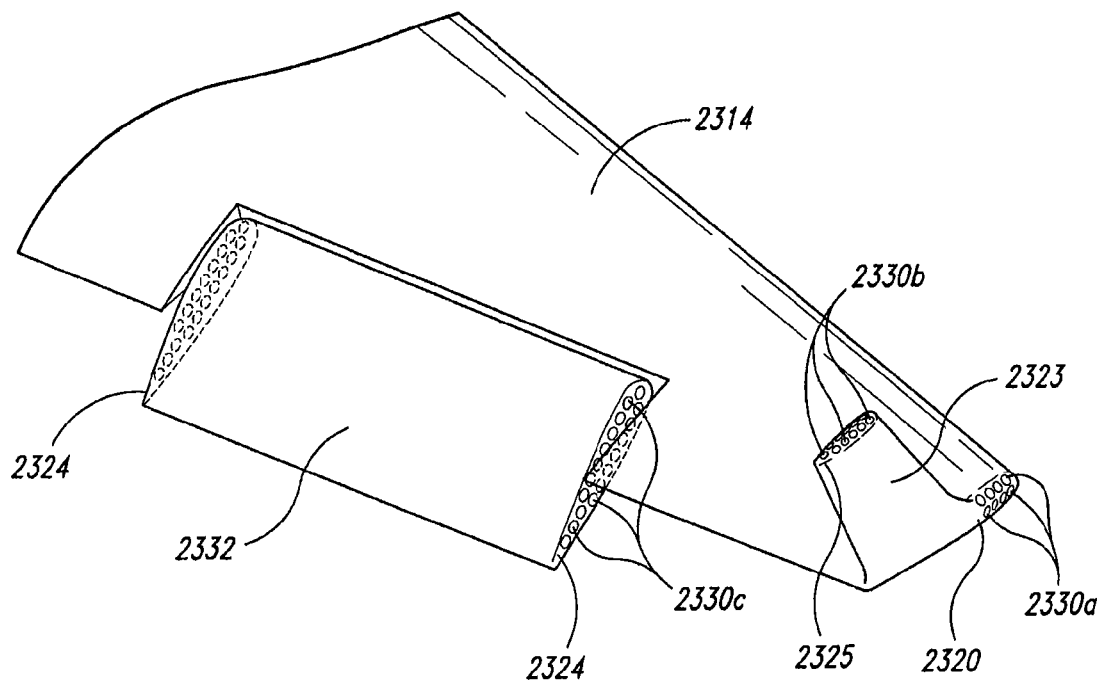
FIG. 23 is a partially schematic illustration of an aircraft system that includes vortex dissipation devices configured in accordance with still further embodiments of the invention.

FIG. 23 is a partially schematic illustration of a wing 2314, illustrating several different vortex dissipation devices 2330a-c (referred to collectively as vortex dissipation devices 2330) in accordance with several additional embodiments of the invention. For purposes of illustration, these devices are shown on a single wing 2314. Wings in accordance with still further embodiments can include various combinations of the illustrated vortex dissipation devices 2330, or any of the illustrated devices 2330 singly. Any of these devices 2330 can have fixed geometry orifices that deliver time-varying jet pulses, or spatially mobile orifices that deliver steady jet flows, or orifices that are both spatially mobile and that deliver time-varying jet pulses.

The wing 2314 can include a wing tip 2320 having a wing tip vortex dissipation device 2330a. The wing tip vortex dissipation device 2330a can have a configuration generally similar to any of those described above. The wing 2314 can also include a winglet 2323, which can include a winglet tip 2325 with (optionally) a winglet tip vortex dissipation device 2330b. In some embodiments, the size of the winglet 2323 can determine whether or not the winglet 2323 is outfitted with a winglet tip vortex dissipation device 2330b. In general, the larger the winglet 2323, the greater the potential benefit from the winglet tip vortex dissipation device 2330b.

The wing 2314 can also include a trailing edge device 2322 (e.g., a flap) having trailing edge device tips 2324. The trailing edge device tips 2324 can be outfitted with trailing edge device tip vortex dissipation devices 2330c. Again, it is expected that the larger the trailing edge device 2322, the greater the expected benefit from the trailing edge device tip vortex dissipation devices 2330c.

FIGS. 24A-24F schematically illustrate vortex dissipation devices that expel air (or another fluid) through airfoil orifices, and also draw fluid into the orifices. This arrangement of forward and reverse flow pulses (sometimes referred to as zero net mass flow pulses) is expected to dissipate, perturb, break up, and/or otherwise reduce the effect of the airfoil tip vortices. It is further expected that the magnitude of the effect created by these pulses will be at least generally similar to the magnitude of the effect created by the one-way pulses described above.

Figure 24A:
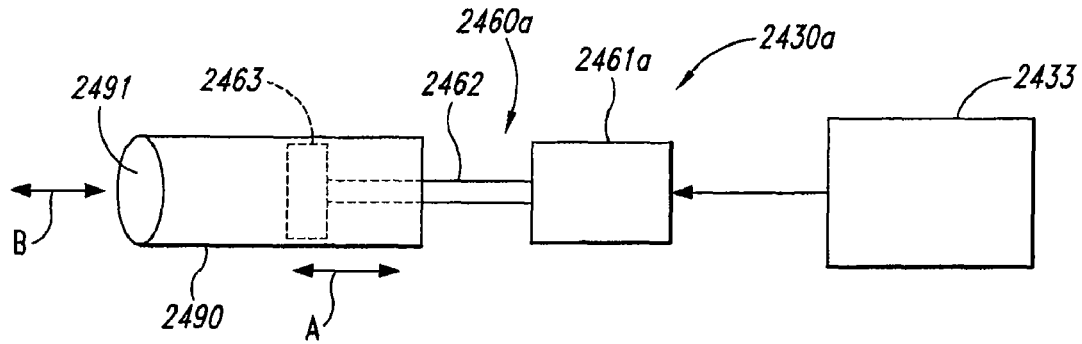
FIGS. 24A-24F are schematic illustrations of vortex dissipation devices in which flow moves both into and out of fluid flow orifices in accordance with further embodiments of the invention.

Beginning with FIG. 24A, a vortex dissipation device 2430a configured in accordance with an embodiment of the invention can include an orifice 2491 that is positioned at or proximate to a tip surface of the airfoil, for example, in a manner generally similar to that shown in any of FIG. 5B, 15B or 20A-20D. The orifice 2491 is in fluid communication with a flow passage 2490 (e.g., a nozzle) through which the air passes. An actuator 2460a is operatively coupled to the orifice 2491 to move the air into and out of the orifice 2491. In an embodiment shown in FIG. 24A, the actuator 2460a can include a piston 2463 carried by a piston shaft 2462 that is coupled to a driver 2461a. The piston 2463 has a surface in fluid communication with the orifice 2491. Accordingly, as the driver 2461a moves the piston 2463 back and forth (indicated by arrow A), external air from the region adjacent to the airfoil is alternately drawn into the orifice 2491 and then forced back out, as indicated by arrow B. The driver 2461a can include any suitable device, for example, an electromagnetic device, a hydraulic device, or a pneumatic device.

A controller 2433 can be coupled to the actuator 2460a to direct its operation. In particular embodiments, the controller 2433 can be programmed to activate the driver 2461a at a frequency in the range of from about 1 Hz to about 10 Hz. In other embodiments, the driver 2461a can be activated at other frequencies, depending upon factors that may include the particular geometry of the airfoil in which the device 2430a is installed, and/or the flight regime in which the airfoil is operated.

FIG. 24A schematically illustrates a single orifice 2491 for purposes of illustration. It will be understood that the device 2430a can include multiple orifices arranged in any of a variety of manners including, but not limited to those described above with reference to FIGS. 5A-23. The manner in which the multiple orifices 2491 are arranged and controlled can also be selected to have the desired effect on the airfoil tip vortices. For example, a single driver 2461a can be coupled to multiple piston shafts 2462 to drive the flow in multiple orifices 2491 in the same manner simultaneously. In other embodiments, each orifice 2491 can have a dedicated driver 2461a. Accordingly, the flow moving into and out of each orifice 2491 can be controlled independently.

Further particular aspects of the device 2430a may also be selected to produce the desired flow characteristics at the orifice 2491, and therefore, the desired effect on the tip vortices. For example, the mass flow of air moved into and out of the orifice 2491 can be controlled by the size of the orifice 2491 and/or the stroke of the piston 2463. The velocity of the air as it moves through the orifice 2491 can be controlled by the velocity of the piston 2463 and/or the size of the orifice 2491 relative to the cross-sectional flow area of the flow passage 2490. For example, the flow area of the orifice 2491 can be made smaller than the cross sectional flow area of the flow passage 2490 to increase the velocity of air through the orifice 2491. A representative example of such a configuration is discussed below with reference to FIG. 24B.

Figure 24B:
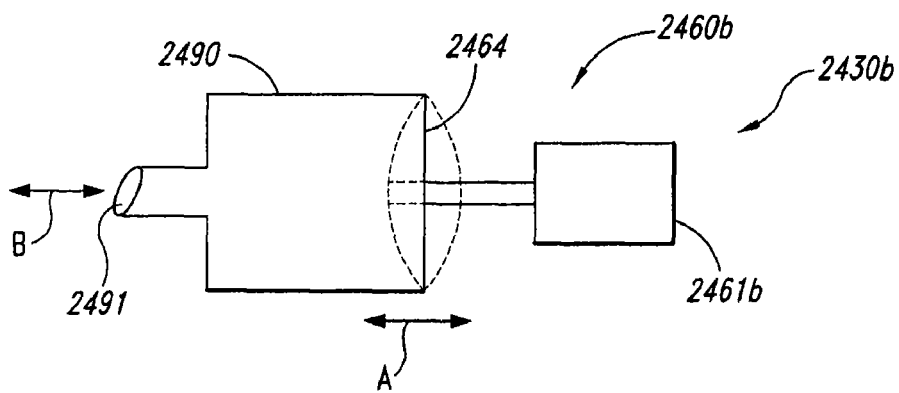

FIG. 24B illustrates a vortex dissipation device 2430b configured in accordance with another embodiment of the invention. In the illustrated embodiment, the orifice 2491 has a smaller flow area than does the flow passage 2490. Accordingly, flow will tend to be accelerated through the orifice 2491. This arrangement can be used in cases where it is expected that the increased velocity at the orifice 2491 will have the desired effect on the tip vortices. The device 2430b can also include an actuator 2460b that in turn includes a diaphragm 2464 coupled to a driver 2461b. The diaphragm 2464 can include any suitable flexible, resilient material that is capable of being driven at the frequencies described above, and that deflects by an amount sufficient to move the desired mass flow of air through the orifice 2491. The driver 2461b can include any suitable device, for example, a linear electromagnetic, hydraulic, or pneumatic device.

Figure 24C:
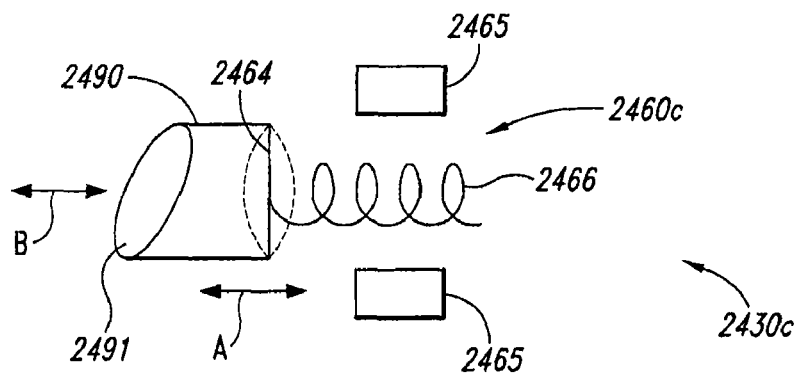

FIG. 24C illustrates another device 2430c that includes the diaphragm 2464 coupled to an actuator 2460c configured in accordance with another embodiment of the invention. In this embodiment, the actuator 2460c can be configured generally similarly to that of an acoustic speaker. Accordingly, the diaphragm 2464 can be connected to a coil 2466 that is suspended proximate to a magnet 2465 (e.g., one or more annularly disposed magnet segments). In operation, the coil 2466 is driven back and forth, as indicated by arrow A, by varying the electromagnetic field within which the coil 2466 is positioned. In other embodiments, the diaphragm 2464 can operate piezoelectrically.

Figure 24D:
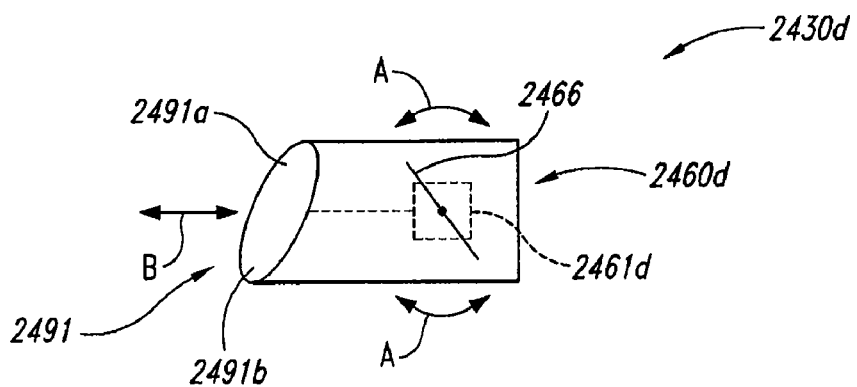

FIG. 24D illustrates a device 2430d configured in accordance with still another embodiment of the invention. In the illustrated embodiment, air is driven back and forth through the orifice 2491 by an actuator 2460d that includes a driver 2461d connected to a rotatable vane 2466. The driver 2161d is configured to rotatably oscillate the vane 2466, as indicated by arrows A, which in turn moves air into and out of the orifice 2491. In one aspect of an embodiment shown in FIG. 24D, the entire vane 2466 can be housed within a single flow passage 2490 coupled to a single orifice 2491. In other embodiments, the flow passage 2490 can be divided, as indicated in dashed lines, to provide two orifices (shown as a first orifice 2491a and a second orifice 2491b). In this arrangement, pulses of air move into the first orifice 2491a while pulses of air move out of the second orifice 2491b, and vice versa.

Figure 24E:
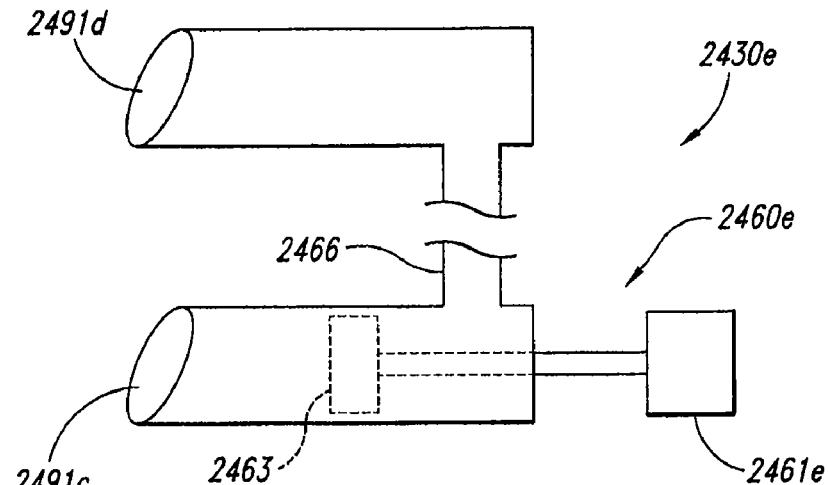

FIG. 24E illustrates a device 2430e having multiple orifices in fluid communication with each other, in accordance with another embodiment of the invention. The device 2430e can include two orifices 2491 (shown as a first orifice 2491c and a second orifice 2491d) that are coupled together via a communication channel 2466. An actuator 2460e is operatively coupled between the two orifices 2491c, 2491d so as to be in fluid communication with both. For example, the actuator 2460e can include a piston 2463 coupled to a driver 2461e. As the piston 2463 moves toward the first orifice 2491c, it expels air from the first orifice 2491e and draws air into the second orifice 2491d. As the piston 2463 moves away from the first orifice 2491c, it draws air into the first orifice 2491c and expels air from the second orifice 2491d. The two orifices 2491c, 2491d can be adjacent to each other or remote from each other. In further embodiments, multiple orifices 2491 can be connected with a network of communication channels 2466, and suitably positioned valves can be used to select any of a variety of pairs (or other combinations) of orifices to operate in an alternating fashion.

Figure 24F:
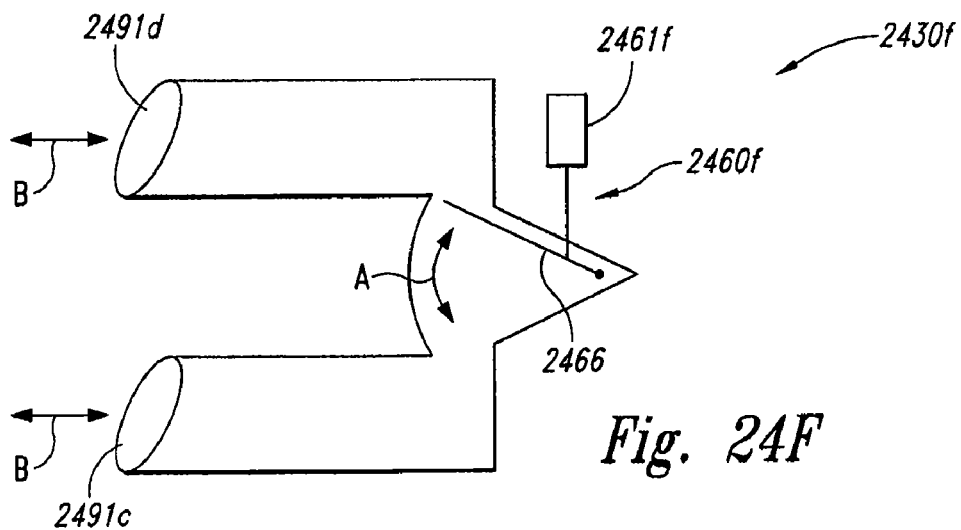

FIG. 24F illustrates a device 2430f having multiple orifices in fluid communication with each other, in accordance with still another embodiment of the invention. The device 2430f can include a first orifice 2491c and a second orifice 2491d that are coupled together via a communication channel 2466. An actuator 2460f is operatively coupled between the two orifices 2491c, 2491d so as to be in fluid communication with both. In this embodiment, the actuator 2460f can include a vane 2466 coupled to a driver 2461f. As the vane 2466 rotates toward the first orifice 2491c (indicated by arrow A), it expels air from the first orifice 2491c and draws air into the second orifice 2491d. As the vane 2466 rotates away from the first orifice 2491c, it draws air into the first orifice 2491c and expels air from the second orifice 2491d. As discussed above with reference to FIG. 24E, the two orifices 2491c, 2491d can be adjacent to each other or remote from each other, and/or multiple orifices or orifice pairs can be networked together.

Figure 25A:
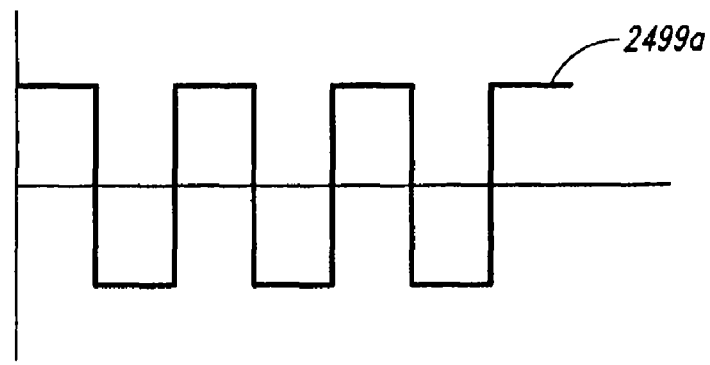
FIGS. 25A-25C schematically illustrate manners for pulsing fluid flow through orifices in accordance with still further embodiments of the invention.
Figure 25B:
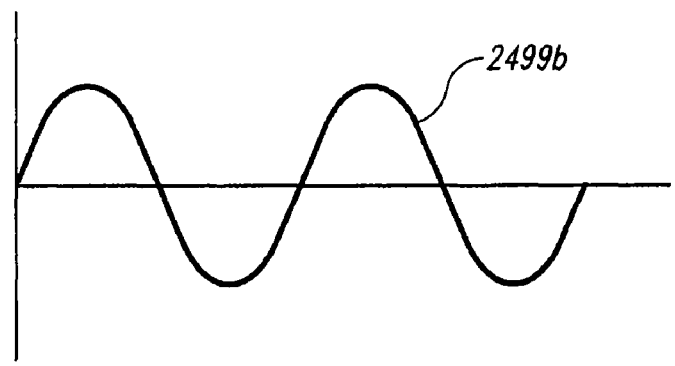
Figure 25C:
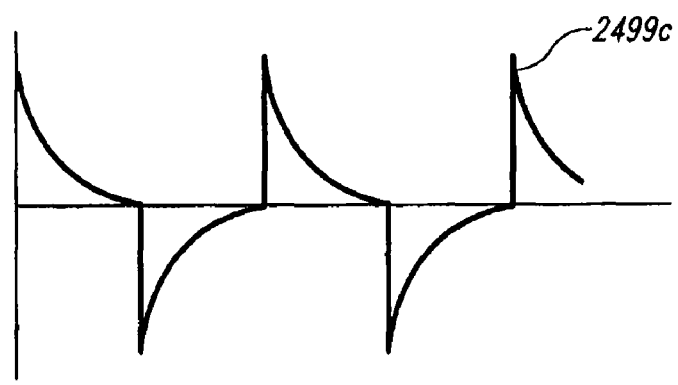

In still further embodiments, air can be moved into and out of corresponding orifices in accordance with other embodiments. In any of these embodiments, the amount of air moved out of an orifice during one phase of a given pulse cycle is generally equal to the amount of air moved into the orifice during a subsequent phase of the cycle. FIGS. 25A-25C illustrate representative pulse profiles 2499a-2499c, respectively, that produce this result. For example, the pulse profile 2499a shown in FIG. 25A can have a generally square shape, with the integrated area (proportional to mass flow) for pulses above the horizontal axis being generally equal to the integrated area for pulses below the horizontal axis.

The pulse profile 2499b shown in FIG. 25B illustrates a sinusoidally varying pattern of pulses, and the pulse profile 2499c illustrated in FIG. 25C illustrates an arrangement in which the mass flow driven during the beginning of each pulse is greater than the mass flow driven during the end of the pulse. In other embodiments, the pulse profiles can have any of a wide variety of shapes, depending upon the particular installation.

In any of the foregoing embodiments described above with reference to FIGS. 24A-25C, the zero net mass flow arrangement of the pulses can produce several benefits. For example, this arrangement does not require a separate source of pressurized air to produce the pulses. As a result, the system does not require bleed air or compressed air produced by the engine. This arrangement can accordingly reduce the impact of the vortex dissipation system on engine efficiency. Furthermore, this arrangement may reduce overall system weight and complexity. In particular, the system does not require ducting to deliver compressed air from the engine (or another compressor) to the airfoil tip. Conversely, in some instances, aspects of other arrangements may also have particular benefits. For example, in some instances the valving arrangement described above with reference to FIG. 22 may have a lower weight than the multiple actuators described above with reference to FIG. 24A. Accordingly, the appropriate vortex dissipation device may be selected based on the particular aircraft design requirements at hand.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. In a particular example, the time-varying characteristics of the nozzle flow described above may be combined with the spatially varying characteristics of the nozzles, which were also described above. In a particular embodiment, nozzles having spatially fixed locations, but that deliver pulsed jet flows, can be provided in a wing tip, and nozzles having the opposite characteristics (spatially mobile, but a steady jet flow) can be provided in the tip of a flap or other high-lift device. In other embodiments, the locations of the fixed and movable nozzles can be reversed. The flow that is pulsed through the nozzles can be pulsed at frequencies less than 1 Hz, greater than 10 Hz or frequencies between 1 and 10 Hz in various embodiments.

Any of the nozzles described above can have features that differ from those shown in the Figures and described in the associated text. For example, while the nozzles shown in the Figures have a generally circular cross-sectional exit shape, in other embodiments, the nozzle exits (and/or other regions of the nozzle) can have non-circular cross-sectional shapes. Multiple nozzles can be combined (e.g., in the form of a slot) to reduce the overall number of individual nozzles, and in other embodiments, the number of individual nozzles can be increased from the numbers shown in the Figures. The nozzles can have shapes and configurations different than those shown in the Figures and described above, and can be installed on aircraft having configurations different than those shown in the Figures and described above. In many cases, the nozzles are configured to direct air from the tips of the airfoils, and in some cases, the nozzles can direct other gases or other fluids. While advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

The invention claimed is:

1. A method of controlling a vortex created by a body comprising a plurality of rotatable nozzle members comprising orifices coupled to a plurality of interior volumes respectively, the method comprising:
   expanding an interior volume among the interior volumes such that a fluid is pulled into the interior volume through a respective orifice among the orifices;
   contracting the interior volume such that the fluid is expelled from the interior volume through the respective orifice;
   alternating expanding and contracting each of the interior volumes such that a jet stream is generated; and
   rotating the rotatable nozzle members to an angular orientation to direct discharge of the let stream according to the angular orientation thereby dissipating the vortex.

2. The method of claim 1, wherein:
   the step of expanding the interior volume creates a negative pressure in the interior volume to pull the fluid into the interior volume; and
   the step of contracting the interior volume creates a positive pressure in the interior volume to expel the fluid out of the interior volume.

3. The method of claim 1, further comprising selectively controlling a flow of a pressurized fluid through the orifices, wherein the orifices are coupled to a source of the pressurized fluid.

4. The method of claim 1, further comprising delivering pulses of the fluid through each of the orifices at a frequency in a frequency range of about 1 Hz to about 10 Hz.

5. The method of claim 1, further comprising selectively activating the orifices.

6. The method of claim 5, further comprising arranging the orifices in at least two rows comprising a first orifice row positioned toward a first flow surface of the body and a second orifice row positioned toward a second flow surface of the body.

7. The method of claim 6, further comprising selectively activating at least one orifice of the first orifice row while deactivating at least one orifice of the second orifice row, and to selectively activating at least one orifice of the second orifice row while deactivating at least one orifice of the first orifice row.

8. A method of controlling an airfoil tip vortex created by an aerodynamic body comprising a plurality of rotatable nozzle members comprising orifices coupled to a plurality of interior volumes respectively, the method comprising:
   expanding an interior volume among the interior volumes such that a fluid is pulled into the interior volume through a respective orifice among the orifices;
   contracting the interior volume such that the fluid is expelled from the interior volume through the respective orifice;
   alternating expanding and contracting each of the interior volumes such that a jet stream is generated; and
   rotating the rotatable nozzle members to an angular orientation to direct discharge of the jet stream according to the angular orientation thereby dissipating the airfoil tip vortex.

9. The method of claim 8, wherein:
   the step of expanding the interior volume creates a negative pressure in the interior volume to pull the fluid into the interior volume; and the step of contracting the interior volume creates a positive pressure in the interior volume to expel the fluid out of the interior volume.

10. The method of claim 8, further comprising selectively controlling a flow of a pressurized fluid through the orifices, wherein the orifices are coupled to a source of the pressurized fluid.

11. The method of claim 8, further comprising delivering pulses of the fluid through each of the orifices at a frequency in a frequency range of about 1 Hz to about 10 Hz.

12. The method of claim 8, further comprising selectively activating the orifices.

13. The method of claim 8, further comprising arranging the orifices in at least two rows comprising a first orifice row positioned toward a first flow surface of the body and a second orifice row positioned toward a second flow surface of the body.

14. The method of claim 13, further comprising selectively activating at least one orifice of the first orifice row while deactivating at least one orifice of the second orifice row, and to selectively activating at least one orifice of the second orifice row while deactivating at least one orifice of the first orifice row.

15. A method of controlling a wing tip vortex created by an aerodynamic body comprising a plurality of rotatable nozzle members comprising orifices coupled to a plurality of interior volumes respectively, the method comprising:
expanding an interior volume among the interior volumes such that a fluid is pulled into the interior volume through a respective orifice among the orifices;
contracting the interior volume such that the fluid is expelled from the interior volume through the respective orifice;
alternating expanding and contracting each of the interior volumes such that a jet stream is generated; and
rotating the rotatable nozzle members to an angular orientation to direct discharge of the jet stream according to the angular orientation thereby dissipating the wing tip vortex.

16. The method of claim 15, wherein:
the step of expanding the interior volume creates a negative pressure in the interior volume to pull the fluid into the interior volume; and
the step of contracting the interior volume creates a positive pressure in the interior volume to expel the fluid out of the interior volume.

17. The method of claim 15, further comprising selectively controlling a flow of a pressurized fluid through the orifices, wherein the orifices are coupled to a source of the pressurized fluid.

18. The method of claim 15, further comprising selectively activating the orifices.

19. The method of claim 15, further comprising arranging the orifices in at least two rows comprising a first orifice row positioned toward a first flow surface of the body and a second orifice row positioned toward a second flow surface of the body.

20. The method of claim 19, further comprising selectively activating at least one orifice of the first orifice row while deactivating at least one orifice of the second orifice row, and to selectively activating at least one orifice of the second orifice row while deactivating at least one orifice of the first orifice row.

* * * * *